United States Patent
Juranovic

(12) 
(10) Patent No.: US 6,375,466 B1
(45) Date of Patent: Apr. 23, 2002

(54) METHOD FOR TEACHING ECONOMICS, MANAGEMENT AND ACCOUNTING

(76) Inventor: Milan Juranovic, c/o Hotel Dubrovnik, Gajeva 1, 10000 Zagreb (HR)

(*) Notice: Subject to any disclaimer, the term of this patent is extended or adjusted under 35 U.S.C. 154(b) by 0 days.

(21) Appl. No.: 09/556,676

(22) Filed: Apr. 21, 2000

Related U.S. Application Data

(60) Provisional application No. 60/130,658, filed on Apr. 23, 1999.

(51) Int. Cl.⁷ ............................................. G09B 19/18
(52) U.S. Cl. ........................ 434/107; 273/297; 273/292; 434/128; 434/129
(58) Field of Search ................................ 434/107, 109, 434/110, 128, 129; 273/297, 236, 256, 278, 292

(56) References Cited

U.S. PATENT DOCUMENTS

| | | | |
|---|---|---|---|
| 1,779,584 A | * 10/1930 | Brown | |
| 2,174,058 A | * 9/1939 | Mcgennis | |
| 3,889,395 A | * 6/1975 | Zegel | |
| 4,150,827 A | 4/1979 | Barnett | |
| 4,279,422 A | * 7/1981 | Shaw | 273/256 |
| 4,289,313 A | 9/1981 | Delamontagne | |
| 4,452,457 A | 6/1984 | Atieh et al. | |
| 4,484,748 A | * 11/1984 | Beeze | 273/256 |
| 4,501,425 A | 2/1985 | Alvarado | |
| 4,840,382 A | * 6/1989 | Rubin | 273/237 |
| 5,056,792 A | * 10/1991 | Helweg-Larsen et al. | 273/278 |
| 5,071,135 A | 12/1991 | Campbell | |
| 5,407,207 A | 4/1995 | Stanford | |
| 5,788,234 A | 8/1998 | Siofer | |
| 5,826,878 A | 10/1998 | Kiyosaki et al. | |
| 5,829,746 A | * 11/1998 | Pacella | 273/256 |
| 5,934,674 A | * 8/1999 | Bukowsky | 273/278 |
| 6,032,957 A | * 3/2000 | Kiyosaki | 273/256 |

FOREIGN PATENT DOCUMENTS

| | | |
|---|---|---|
| GB | 1432761 | 4/1976 |
| GB | 2132907 | 7/1984 |

* cited by examiner

*Primary Examiner*—Jacob K. Ackun, Jr.
*Assistant Examiner*—Bena B. Miller
(74) *Attorney, Agent, or Firm*—Richard C. Lithan

(57) ABSTRACT

A method for teaching economics and related practices provides a "virtual enterprise" in which various economic transactions are made. Participants or "stakeholders" in the teaching session take roles of various corporate, government, and other officials, managers, and employees. Various transactions are defined, along with corresponding transaction cards according to the transaction table of a transaction sheet. The positions of the participants may also be shown on a portion of the transaction sheet, with a cash flow statement and balance sheet shown in another area of the transaction sheet. Transaction cards are drawn singly and corresponding transactions are entered in appropriate lines of the transaction table, monitoring system, balance sheet and corresponding profit and loss statement, and cash flow statement of the transaction sheet. The present teaching method emphasizes the giving and receiving of goods and/or services, and corresponding credits and debits, relating to the parties involved in all such business and economic transactions, and clearly indicates the responsibility and/or rights of each of the parties involved in a given transaction. The present teaching method is non-competitive, with no simulated currency being accrued by any of the participants, and no score being maintained for any of the participants. Rather, the present method tracks the interactions and results of transactions between participants, to show their effects. The present method is also adaptable to computerized operation. The participants may be physically separated and may participate using a computer network.

20 Claims, 32 Drawing Sheets

| # | TRANSACTION | DEBIT | CREDIT | CARD | VALUE |
|---|---|---|---|---|---|
| 01 | INVESTMENT BY SHAREHOLDER | FM | SH | | 40 |
| 02 | PURCHASE TECHNOL. PRODUCTION | TM | TS | | 01 |
| 03 | PURCHASE TECHNOL. ADMINISTRATION | TM | TS | | 07 |
| 04 | PURCHASE EQUIPM. PRODUCTION | TM | TS | | 02 |
| 05 | PURCHASE EQUIPM. ADMINISTR. | TM | TS | | 08 |
| 06 | PAYMENT TECH/EQUIP. SUPPLIER | TS | FM | | 40 |
| 07 | USE TECH. PROD.-amortization a | PM | TM | | 13 |
| 08 | USE TECH. ADM.-amortization a | SH | TM | | 19 |
| 09 | USE EQUIP. PROD.-depreciation d | PM | TM | | 14 |
| 10 | USE EQUIP. ADM.-depreciation d | SH | TM | | 20 |
| 11 | PURCHASE MATERIALS PRODUCTION | MM | MS | | 03 |
| 12 | PURCHASE MATERIALS ADMINISTR. | MM | MS | | 09 |
| 13 | PURCHASE ENERGY PRODUCTION | MM | MS | | 04 |
| 14 | PURCHASE ENERGY ADMINISTR | MM | MS | | 10 |
| 15 | PAYMENT MAT/ENERGY SUPPLIER | MS | FM | | 40 |
| 16 | USE MATERIALS PRODUCTION m | PM | MM | | 15 |
| 17 | USE MATERIALS ADMINISTRATION m | SH | MM | | 21 |
| 18 | USE ENERGY IN PRODUCTION e | PM | MM | | 16 |
| 19 | USE ENERGY ADMINISTRATION e | SH | MM | | 22 |
| 20 | PURCHASE WORK PRODUCTION | WM | WS | | 05 |
| 21 | PURCHASE WORK ADMINISTRATION | WM | WS | | 11 |
| 22 | GT WITHHOLDINGS PRODUCTION | WM | GT | | 35 |
| 23 | GT WITHHOLDINGS ADMINISTR | WM | GT | | 35 |
| 24 | PAYMENT (NET) EMPLOYEES PROD. | WS | FM | | 40 |
| 25 | PAYMENT (NET) EMPLOYEES ADMIN. | WS | FM | | 40 |
| 26 | PAYMENT GT WITHHOLDINGS | GT | FM | | 17 |
| 27 | USE WORK IN PRODUCTION w | PM | WM | | 23 |
| 28 | USE WORK IN ADMINISTRATION w | SH | WM | | 06 |
| 29 | PURCHASE SERVICES PRODUCTION | WM | WS | | 12 |
| 30 | PURCHASE SERVICES ADMINISTR. | WM | WS | | 36 |
| 31 | TAX ON SERVICES PRODUCTION | WS | GT | | 36 |
| 32 | TAX ON SERVICES ADMINISTRATION | WS | GT | | 36 |
| 33 | PAY (NET) SERVICES SUPPLIERS | WS | FM | | 40 |
| 34 | PAYMENT TAXES ON SERVICES | GT | FM | | 40 |
| 35 | USE SERVICE IN PRODUCTION | PM | SM | | 18 |
| 36 | USE SERVICE IN ADMINISTR. | SH | SM | | 24 |
| 37 | WAREHOUSING FIN. PRODUCT s | SM | SM | | 25 |
| 38 | WAREHOUSING FIN. PRODUCT a | SM | SM | | 26 |
| 39 | WAREHOUSING FIN. PRODUCT d | SM | PM | | 27 |
| 40 | WAREHOUSING FIN. PRODUCT m | SM | PM | | 28 |
| 41 | WAREHOUSING FIN. PRODUCT e | SM | PM | | 29 |
| 42 | WAREHOUSING FIN. PRODUCT w | SM | PM | | 30 |
| 43 | WAREHOUSING FIN. PRODUCT s | SM | PM | | 31 |
| 44 | COSTING FIN. PRODUCT SOLD | SH | SM | | 32 |
| 45 | SALE OF FINISHED PRODUCT | BY | SM | | 33 |
| 46 | INVOICE DELIVERED PRODUCTS | BY | SH | | 34 |
| 47 | CONSUMER TAX OR VAT | GT | GT | | 40 |
| 48 | COLLECTION OF INVOICES | FM | BY | | 40 |
| 49 | PAYMENT CONSUMER TAX OR VAT | GT | FM | | 40 |
| 50 | LOAN RECEIVED FROM BANK | FM | BK | | 40 |
| 51 | INTEREST (EXPENSE) | SH | BK | | 38 |
| 52 | PAYMENT OF LOAN AND INTEREST | BK | FM | | 40 |
| 53 | LOAN GIVEN/PAYMENT | BY | FM | | 40 |
| 54 | INTEREST (INCOME) | BY | SH | | 41 |
| 55 | COLLECTION LOAN AND INTEREST | FM | BY | | 40 |
| 56 | PURCHASE OF SECURITIES | FM | BR | | 42 |
| 57 | BROKER'S FEES AND SERVICES | BR | BR | | 39 |
| 58 | PAYMENT TO BROKER | BR | FM | | 40 |
| 59 | COSTING OF SECURITIES SOLD | SH | SH | | 43 |
| 60 | SALE OF SECURITIES | BY | SH | | 44 |
| 61 | INVOICE DELIVERED SECURITIES | BY | SH | | 45 |
| 62 | COLLECTION OF SECURITIES SOLD | FM | BY | | 40 |
| 63 | INCOME TAX | SH | GT | | 37 |
| 64 | PAYMENT OF INCOME TAX | GT | FM | | 40 |
| 65 | DECLARING DIVIDENDS | SH | SH | | 46 |
| 66 | DIVIDENDS PAID IN SHARES | SH | SH | | 47 |
| 67 | DIVIDENDS PAID IN CASH | SH | FM | | 40 |
| 68 | INTEREST EARNED ON CASH | FM | SH | | 41 |

FIG. 1B

| | BALANCE SHEET | | | |
|---|---|---|---|---|
| DATE: | | HOUR | | |
| + | ASSETS | + | − | + |
| FM | CASH | | | |
| BY | TRADE RECEIVABLES | | | |
| BY | OTHER RECEIVABLES | | | |
| FM | SECURITIES | | | |
| MM | MATERIALS/ENERGY/PROD. | | | |
| MM | MATERIALS/ENERGY/ADMIN. | | | |
| WM | WORK/SERVICES/PRODUCT | | | |
| WM | WORK/SERVICES/ADMINIST. | | | |
| PM | PRODUCTS IN PROCESS | | | |
| SM | PRODUCTS FINISHED | | | |
| TM | TECHNOL PRODUCTION | | | |
| TM | TECHNOL ADMINISTRATION | | | |
| TM | EQUIPMENT PRODUCTION | | | |
| TM | EQUIPMENT ADMINISTRATION | | | |
| | TOTAL ASSETS | | | |
| + | LIABILITIES & EQUITY | − | + | + |
| BK | BANK/CREDITOR PAYABLE | | | |
| MS | MATERIALS/ENERGY/PAY. | | | |
| WS | EMPLOYEES PAYABLES | | | |
| WS | SERVICES PAYABLE | | | |
| GT | WITHOLDINGS PAYABLE | | | |
| GT | CONSUMER TAX PAYABLE | | | |
| TS | TECH/EQUIP. PAYABLES | | | |
| BR | BROKER PAYABLE | | | |
| GT | INCOME TAX PAYABLE | | | |
| SH | SHAREHOLDER'S INVESTMT. | | | |
| SH | PROFIT RETAINED | | | |
| | TOTAL LIABILITY/EQUITY | + | | |
| + | PROFIT (INCOME) STATEMENT | − | + | + |
| SH | SALES (NET) | | + | + |
| SH | LESS: COST OF SALES | − | | − |
| | GROSS PROFIT | | | |
| SH | TECHN. ADMIN. −amort   a | − | | − |
| SH | EQUIP. ADMIN. −deprec. d | − | | − |
| SH | MATERIALS ADMIN. −used  m | − | | − |
| SH | ENERGY ADMIN. −used    e | − | | − |
| SH | WORK ADMIN. −used      w | − | | − |
| SH | SERVICES ADMIN. −used  s | − | | − |
| SH | INTEREST EXPENSE/INCOME | − | + | |
| SH | INCOME FROM SECURTIES | | + | |
| SH | BROKERAGE SERVICE | − | | |
| | NET INCOME BEFORE TAX | | | |
| SH | LESS TAXES | − | | − |
| SH | NET INCOME AFTER TAX | | | |

NOTES

| | TRANSACTION | DEBIT | CREDIT | CARD | VALUE |
|---|---|---|---|---|---|
| 01 | INVESTMENT BY SHAREHOLDER | FM | SH | 40 | 50 |
| 02 | PURCHASE TECHNOL PRODUCTION | TM | TS | 01 | |
| 03 | PURCHASE TECHNOL ADMINISTRATION | TM | TS | 07 | |
| 04 | PURCHASE EQUIPM. PRODUCTION | TM | TS | 02 | |
| 05 | PURCHASE EQUIPM. ADMINISTR. | TM | TS | 08 | |
| 06 | PAYMENT TECH/EQUIP. SUPPLIER | TS | FM | 40 | |
| 07 | USE TECH PROD.-amortization a | PM | TM | 13 | |
| 08 | USE TECH. ADM.-amortization a | SH | TM | 19 | |
| 09 | USE EQUIP. PROD.-depreciation d | PM | TM | 14 | |
| 10 | USE EQUIP. ADM.-depreciation d | SH | TM | 20 | |
| 12 | PURCHASE MATERIALS PRODUCTION | MM | MS | 03 | |
| 13 | PURCHASE MATERIALS ADMINISTR. | MM | MS | 09 | |
| 14 | PURCHASE ENERGY PRODUCTION | MM | MS | 04 | |
| 15 | PURCHASE ENERGY ADMINISTR. | MM | MS | 10 | |
| 16 | PAYMENT MAT/ENERGY SUPPLIER | MS | FM | 40 | |
| 17 | USE MATERIALS PRODUCTION m | PM | MM | 15 | |
| 18 | USE MATERIALS ADMINISTRATION m | SH | MM | 21 | |
| 19 | USE ENERGY IN PRODUCTION e | PM | MM | 16 | |
| 20 | USE ENERGY ADMINISTRATION e | SH | MM | 22 | |
| 21 | "PURCHASE" WORK PRODUCTION | WS | WM | 05 | |
| 22 | "PURCHASE" WORK ADMINISTRATION | WS | WM | 11 | |
| 23 | GT WITHHOLDINGS PRODUCTION | WS | GT | 35 | |
| 24 | GT WITHHOLDINGS ADMINISTR. | WS | GT | 35 | |
| 25 | PAYMENT (NET) EMPLOYEES PROD. | WS | FM | 40 | |
| 26 | PAYMENT (NET) EMPLOYEES ADMIN. | WS | FM | 40 | |
| 27 | PAYMENT GT WITHHOLDINGS | GT | FM | 40 | |
| 28 | USE WORK IN PRODUCTION w | PM | WS | 17 | |
| 29 | USE WORK IN ADMINISTRATION w | SH | WS | 23 | |
| 30 | PURCHASE SERVICES PRODUCTION | WM | WS | 06 | |
| 31 | PURCHASE SERVICES ADMINISTR. | WM | WS | 12 | |
| 32 | TAX ON SERVICES PRODUCTION | WS | GT | 36 | |
| 33 | TAX ON SERVICES ADMINISTRATION | WS | GT | 36 | |
| 34 | PAY. (NET) SERVICES SUPPLIERS | WS | FM | 40 | |
| 35 | PAYMENT TAXES ON SERVICES | GT | FM | 40 | |
| 36 | USE SERVICE IN PRODUCTION s | PM | WM | 18 | |
| 37 | USE SERVICE IN ADMINISTR. s | SH | WM | 24 | |
| 38 | WAREHOUSING FIN. PRODUCT o | SM | PM | 25 | |
| 39 | WAREHOUSING FIN. PRODUCT | SM | PM | 26 | |
| 40 | WAREHOUSING FIN. PRODUCT | SM | PM | 27 | |
| 41 | WAREHOUSING FIN. PRODUCT e | SM | PM | 28 | |
| 42 | WAREHOUSING FIN. PRODUCT w | SM | PM | 29 | |
| 43 | WAREHOUSING FIN. PRODUCT s | SM | PM | 30 | |
| 44 | COSTING FIN. PRODUCT SOLD | SH | SM | 31 | |
| 45 | SALE OF FINISHED PRODUCT | BY | SH | 32 | |
| 46 | INVOICE DELIVERED PRODUCTS | BY | SH | 33 | |
| 47 | CONSUMER TAX OR VAT | BY | GT | 34 | |
| 49 | COLLECTION OF INVOICES | FM | BY | 40 | |
| 50 | PAYMENT CONSUMER TAX OR VAT | GT | FM | 40 | |
| 51 | LOAN RECIEVED FROM BANK | FM | BK | 40 | |
| 52 | INTEREST (EXPENSE) | SH | BK | 38 | |
| 53 | PAYMENT OF LOAN AND INTEREST | BK | FM | 40 | |
| 54 | LOAN GIVEN/PAYMENT | BY | FM | 40 | |
| 55 | INTEREST (INCOME) | BY | SH | 41 | |
| 56 | COLLECTION LOAN AND INTEREST | FM | BY | 40 | |
| 57 | PURCHASE OF SECURITIES | BR | FM | 42 | |
| 58 | BROKER'S FEES AND SERVICES | SH | BR | 39 | |
| 59 | PAYMENT TO BROKER | BR | FM | 40 | |
| 60 | COSTING OF SECURITIES SOLD | SH | FM | 43 | |
| 61 | SALE OF SECURITIES | BY | SH | 44 | |
| 62 | INVOICE DELIVERED SECURITIES | BY | SH | 45 | |
| 63 | COLLECTION OF SECURITIES SOLD | FM | BY | 40 | |
| 64 | INCOME TAX | SH | GT | 37 | |
| 65 | PAYMENT OF INCOME TAX | GT | FM | 40 | |
| 66 | DECLARING DIVIDENDS | SH | FM | 46 | |
| 67 | DIVIDENDS "PAID" IN SHARES | SH | FM | 47 | |
| 68 | DIVIDENDS PAID IN CASH | SH | FM | 40 | |
| 69 | INTEREST EARNED ON CASH | FM | SH | 41 | |

| | | BALANCE SHEET | | | |
|---|---|---|---|---|---|
| | 98 | | 102 HOUR | 104 | 106 |
| 96 DATE: | | | | | |
| + | | ASSETS | + | − | + |
| 0 | FM | CASH | 50 | | 50 |
| | BY | TRADE RECEIVABLES | | | |
| | BY | OTHER RECEIVABLES | | | |
| 148 | FM | SECURITIES | | | |
| | MM | MATERIALS/ENERGY/PROD. | | | |
| | MM | MATERIALS/ENERGY/ADMIN. | | | |
| 90 | WM | WORK/SERVICES/PRODUCT | | | |
| | WM | WORK/SERVICES/ADMINIST. | | | |
| | PM | PRODUCTS IN PROCESS | | | |
| | SM | PRODUCTS FINISHED | | | |
| | TM | TECHNOL. PRODUCTION | | | |
| | TM | TECHNOL. ADMINISTRATION | | | |
| 150 | TM | EQUIPMENT PRODUCTION | | | |
| | TM | EQUIPMENT ADMINISTRATION | | | |
| 0 | | TOTAL ASSETS | 50 | | 50 |
| + | | LIABILITIES & EQUITY | − | + | + |
| 92 | BK | BANK/CREDITOR PAYABLE | | | |
| | MS | MATERIALS/ENERGY/PAY. | | | |
| | WS | EMPLOYEES PAYABLES | | | |
| | WS | SERVICES PAYABLE | | | |
| | GT | WITHOLDINGS PAYABLE | | | |
| 152 | GT | CONSUMER TAX PAYABLE | | | |
| | TS | TECH/EQUIP. PAYABLES | | | |
| | BR | BROKER PAYABLE | | | |
| | GT | INCOME TAX PAYABLE | | | |
| 0 | SH | SHAREHOLDER'S INVESTMT. | | 50 | 50 |
| | SH | PROFIT RETAINED | | | |
| 0 | | TOTAL LIABILITY/EQUITY | + | 50 | 50 |
| 154 | + | PROFIT (INCOME) STATEMENT | − | + | + |
| | SH | SALES (NET) | | + | + |
| | SH | LESS: COST OF SALES | | − | − |
| | | GROSS PROFIT | | | |
| | SH | TECHN. ADMIN. −amort   a | − | | − |
| 94 | SH | EQUIP. ADMIN. −deprec.  d | − | | − |
| | SH | MATERIALS ADMIN. −used  m | − | | − |
| | SH | ENERGY ADMIN. −used     e | − | | − |
| | SH | WORK ADMIN. −used       w | − | | − |
| | SH | SERVICES ADMIN. −used   s | − | | − |
| | SH | INTEREST EXPENSE/INCOME | − | + | |
| | SH | INCOME FROM SECURITIES | − | + | |
| | SH | BROKERAGE SERVICE | − | | |
| | | NET INCOME BEFORE TAX | | | |
| | SH | LESS TAXES | − | | − |
| | SH | NET INCOME AFTER TAX | | | |

NOTES

FIG. 2D

| # | TRANSACTION | DEBIT | CREDIT | CARD | VALUE |
|---|---|---|---|---|---|
| 01 | INVESTMENT BY SHAREHOLDER | FM | SH | | 40 |
| 02 | PURCHASE TECHNOL. PRODUCTION | TM | TS | | 01 |
| 03 | PURCHASE TECHNOL. ADMINISTRATION | TM | TS | | 07 |
| 04 | PURCHASE EQUIPM. PRODUCTION | TM | TS | | 02 |
| 05 | PURCHASE EQUIPM. ADMINISTR. | TM | TS | | 08 |
| 06 | PAYMENT TECH/EQUIP. SUPPLIER | TS | FM | | 40 |
| 07 | USE TECH. PROD. – amortization a | PM | TM | | 13 |
| 08 | USE TECH. ADM. – amortization a | SH | TM | | 19 |
| 09 | USE EQUIP. PROD. – depreciation d | PM | TM | | 14 |
| 10 | USE EQUIP. ADM. – depreciation d | SH | TM | | 20 |
| 11 | | | | | |
| 12 | PURCHASE MATERIALS PRODUCTION | MM | MS | | 03 |
| 13 | PURCHASE MATERIALS ADMINISTR. | MM | MS | | 09 |
| 14 | PURCHASE ENERGY PRODUCTION | MM | MS | | 04 |
| 15 | PURCHASE ENERGY ADMINISTR. | MM | MS | | 10 |
| 16 | PAYMENT MAT./ENERGY SUPPLIER | MS | FM | | 40 |
| 17 | USE MATERIALS PRODUCTION m | PM | MM | | 15 |
| 18 | USE MATERIALS ADMINISTRATION m | SH | MM | | 21 |
| 19 | USE ENERGY IN PRODUCTION e | PM | MM | | 16 |
| 20 | USE ENERGY ADMINISTRATION e | SH | MM | | 22 |
| 21 | "PURCHASE" WORK PRODUCTION | WM | WS | | 05 |
| 22 | "PURCHASE" WORK ADMINISTRATION | WM | WS | | 11 |
| 23 | GT WITHHOLDINGS PRODUCTION | WS | GT | | 35 |
| 24 | GT WITHHOLDINGS ADMINISTR. | WS | GT | | 35 |
| 25 | PAYMENT (NET) EMPLOYEES PROD. | WS | FM | | 40 |
| 26 | PAYMENT (NET) EMPLOYEES ADMIN. | WS | FM | | 40 |
| 27 | PAYMENT GT WITHHOLDINGS | GT | FM | | 40 |
| 28 | USE WORK IN PRODUCTION w | PM | WM | | 17 |
| 29 | USE WORK IN ADMINISTRATION w | SH | WM | | 23 |
| 30 | PURCHASE SERVICES PRODUCTION | MM | WS | | 06 |
| 31 | PURCHASE SERVICES ADMINISTR. | MM | WS | | 12 |
| 32 | TAX ON SERVICES PRODUCTION | WS | GT | | 36 |
| 33 | TAX ON SERVICES ADMINISTRATION | WS | GT | | 36 |
| 34 | PAY (NET) SERVICES SUPPLIERS | WS | FM | | 40 |
| 35 | PAYMENT TAXES ON SERVICES | GT | FM | | 40 |
| 36 | USE SERVICE IN PRODUCTION | PM | WM | | 18 |
| 37 | USE SERVICE IN ADMINISTR. | SH | WM | | 24 |
| 38 | WAREHOUSING FIN. PRODUCT | SM | PM | | 25 |
| 39 | WAREHOUSING FIN. PRODUCT | SM | PM | | 26 |
| 40 | WAREHOUSING FIN. PRODUCT m | SM | PM | | 27 |
| 41 | WAREHOUSING FIN. PRODUCT e | SM | PM | | 28 |
| 42 | WAREHOUSING FIN. PRODUCT w | SM | PM | | 29 |
| 43 | WAREHOUSING FIN. PRODUCT s | SM | PM | | 30 |
| 44 | COSTING FIN. PRODUCT SOLD | SH | SM | | 31 |
| 45 | SALE OF FINISHED PRODUCT | BY | PM | | 32 |
| 46 | INVOICE DELIVERED PRODUCTS | BY | PM | | 33 |
| 47 | CONSUMER TAX OR VAT | SM | GT | | 34 |
| 48 | | | | | |
| 49 | COLLECTION OF INVOICES | FM | BY | | 40 |
| 50 | PAYMENT CONSUMER TAX OR VAT | GT | FM | | 40 |
| 51 | LOAN RECIEVED FROM BANK | FM | BK | | 38 |
| 52 | INTEREST (EXPENSE) | SH | BK | | 40 |
| 53 | PAYMENT OF LOAN AND INTEREST | BK | FM | | 40 |
| 54 | LOAN GIVEN/PAYMENT | BY | FM | | 41 |
| 55 | INTEREST (INCOME) | BY | SH | | 40 |
| 56 | COLLECTION LOAN AND INTEREST | FM | BY | | 42 |
| 57 | PURCHASE OF SECURITIES | BR | BR | | 39 |
| 58 | BROKER'S FEES AND SERVICES | SH | BR | | 40 |
| 59 | PAYMENT TO BROKER | BR | FM | | 40 |
| 60 | COSTING OF SECURITIES SOLD | SH | BR | | 43 |
| 61 | SALE OF SECURITIES | BY | FM | | 44 |
| 62 | INVOICE DELIVERED SECURITIES | BY | SH | | 45 |
| 63 | COLLECTION OF SECURITIES SOLD | FM | BY | | 40 |
| 64 | INCOME TAX | SH | GT | | 37 |
| 65 | PAYMENT OF INCOME TAX | GT | FM | | 40 |
| 66 | DECLARING DIVIDENDS | SH | SH | | 46 |
| 67 | DIVIDENDS PAID IN SHARES | SH | SH | | 47 |
| 68 | DIVIDENDS PAID IN CASH | SH | FM | | 40 |
| 69 | INTEREST EARNED ON CASH | FM | SH | | 41 |
| 70 | | | | | |

FIG. 3B

| | | BALANCE SHEET | | | |
|---|---|---|---|---|---|
| 96 | DATE: 98 | 100 | 102 HOUR | 104 | 106 |
| | + | ASSETS | + | − | + |
| | 50 FM | CASH | | | 50 |
| 148 | BY | TRADE RECEIVABLES | | | |
| | BY | OTHER RECEIVABLES | | | |
| | FM | SECURITIES | | | |
| 90 | MM | MATERIALS/ENERGY/PROD. | | | |
| | MM | MATERIALS/ENERGY/ADMIN. | | | |
| | WM | WORK/SERVICES/PRODUCT | | | |
| | WM | WORK/SERVICES/ADMINIST. | | | |
| 166 | PM | PRODUCTS IN PROCESS | | | |
| | SM | PRODUCTS FINISHED | | | |
| 0 | TM | TECHNOL PRODUCTION | //// | 2 //// | 2 |
| | TM | TECHNOL ADMINISTRATION | | | |
| 150 | TM | EQUIPMENT PRODUCTION | | | |
| | TM | EQUIPMENT ADMINISTRATION | | | |
| 50 | | TOTAL ASSETS | | 2 | 52 |
| 92 | + | LIABILITIES & EQUITY | − | + | + |
| | BK | BANK/CREDITOR PAYABLE | | | |
| | MS | MATERIALS/ENERGY/PAY. | | | |
| | WS | EMPLOYEES PAYABLES | | | |
| | WS | SERVICES PAYABLE | | | |
| 168 | GT | WITHOLDINGS PAYABLE | | | |
| | GT | CONSUMER TAX PAYABLE | | | |
| 0 | TS | TECH/EQUIP. PAYABLES | //// | 2 | 2 |
| 152 | BR | BROKER PAYABLE | | | |
| | GT | INCOME TAX PAYABLE | | | |
| 50 | SH | SHAREHOLDER'S INVESTMT. | | | 50 |
| | SH | PROFIT RETAINED | | | |
| 52 | | TOTAL LIABILITY/EQUITY | | | 52 |
| 154 | + | PROFIT (INCOME) STATEMENT | − | + | + |
| | SH | SALES (NET) | | + | + |
| | SH | LESS: COST OF SALES | − | | − |
| | | GROSS PROFIT | | | |
| | SH | TECHN. ADMIN. −amort   a | − | | |
| 94 | SH | EQUIP. ADMIN. −deprec.  d | − | | |
| | SH | MATERIALS ADMIN. −used  m | − | | |
| | SH | ENERGY ADMIN. −used  e | − | | |
| | SH | WORK ADMIN. −used  w | − | | |
| | SH | SERVICES ADMIN. −used  s | − | | |
| | SH | INTEREST EXPENSE/INCOME | − | + | |
| | SH | INCOME FROM SECURTIES | − | + | |
| | SH | BROKERAGE SERVICE | − | | |
| | | NET INCOME BEFORE TAX | | | |
| | SH | LESS TAXES | − | | − |
| | SH | NET INCOME AFTER TAX | | | |

108 → NOTES

FIG. 3D

| | TRANSACTION | DEBIT | CREDIT | CARD VALUE |
|---|---|---|---|---|
| 01 | INVESTMENT BY SHAREHOLDER | FM | SH | 40 |
| 02 | PURCHASE TECHNOL. PRODUCTION | TM | TS | 01 |
| 03 | PURCHASE TECHNOL. ADMINISTRATION | TM | TS | 07 |
| 04 | PURCHASE EQUIPM. PRODUCTION | TM | TS | 02 |
| 05 | PURCHASE EQUIPM. ADMINSTR. | TM | TS | 08 |
| 06 | PAYMENT TECH./EQUIP. SUPPLIER | TS | FM | 40 |
| 07 | USE TECH. PROD.-amortization | PM | TM | 13 |
| 08 | USE TECH. ADM.-amortization | SH | TM | 19 |
| 09 | USE EQUIP. PROD.-depreciation | PM | TM | 14 |
| 10 | USE EQUIP. ADM.-depreciation | SH | TM | 20 |
| 11 | PURCHASE MATERIALS PRODUCTION | MM | MS | 03 |
| 12 | PURCHASE MATERIALS ADMINISTR. | MM | MS | 09 |
| 13 | PURCHASE ENERGY PRODUCTION | MM | MS | 04 |
| 14 | PURCHASE ENERGY ADMINISTR. | MM | MS | 10 |
| 15 | PAYMENT MAT/ENERGY SUPPLIER | MS | FM | 40 |
| 16 | USE MATERIALS PRODUCTION | PM | MM | 15 |
| 17 | USE MATERIALS ADMINISTRATION | SH | MM | 21 |
| 18 | USE ENERGY IN PRODUCTION | PM | MM | 16 |
| 19 | USE ENERGY ADMINISTRATION | SH | MM | 22 |
| 20 | "PURCHASE" WORK PRODUCTION | WM | WS | 05 |
| 21 | "PURCHASE" WORK ADMINISTRATION | WM | WS | 11 |
| 22 | GT WITHHOLDINGS PRODUCTION | WS | GT | 35 |
| 23 | GT WITHHOLDINGS ADMINSTR. | WS | GT | 35 |
| 24 | PAYMENT (NET) EMPLOYEES PROD. | WS | FM | 40 |
| 25 | PAYMENT (NET) EMPLOYEES ADMIN. | WS | FM | 40 |
| 26 | PAYMENT GT WITHHOLDINGS | GT | FM | 40 |
| 27 | USE WORK IN PRODUCTION | PM | WM | 17 |
| 28 | USE WORK IN ADMINISRATION | SH | WM | 23 |
| 29 | PURCHASE SERVICES PRODUCTION | WM | WS | 06 |
| 30 | PURCHASE SERVICES ADMINSTR. | WM | WS | 12 |
| 31 | TAX ON SERVICES PRODUCTION | WS | GT | 36 |
| 32 | TAX ON SERVICES ADMINISTRATION | WS | GT | 36 |
| 33 | PAY. (NET) SERVICES SUPPLIERS | WS | FM | 40 |
| 34 | PAYMENT TAXES ON SERVICES | GT | FM | 40 |
| 35 | | | | |
| 36 | USE SERVICE IN PRODUCTION | PM | WM | 18 |
| 37 | USE SERVICE IN ADMINISTR. | SH | WM | 24 |
| 38 | WAREHOUSING FIN. PRODUCT s | SM | PM | 25 |
| 39 | WAREHOUSING FIN. PRODUCT o | SM | PM | 26 |
| 40 | WAREHOUSING FIN. PRODUCT d | SM | PM | 27 |
| 41 | WAREHOUSING FIN. PRODUCT m | SM | PM | 28 |
| 42 | WAREHOUSING FIN. PRODUCT e | SM | PM | 29 |
| 43 | WAREHOUSING FIN. PRODUCT w | SM | PM | 30 |
| 44 | COSTING FIN. PRODUCT SOLD | SM | SM | 31 |
| 45 | SALE OF FINISHED PRODUCT | SH | SH | 32 |
| 46 | INVOICE DELIVERED PRODUCTS | SM | SM | 33 |
| 47 | CONSUMER TAX OR VAT | BY | GT | 34 |
| 48 | | | | |
| 49 | COLLECTION OF INVOICES | FM | BY | 40 |
| 50 | PAYMENT CONSUMER TAX OR VAT | GT | FM | 40 |
| 51 | LOAN RECIEVED FROM BANK | FM | BK | 38 |
| 52 | INTEREST (EXPENSE) | SH | BK | 40 |
| 53 | PAYMENT OF LOAN AND INTEREST | BK | FM | 40 |
| 54 | LOAN GIVEN/PAYMENT | BY | FM | 40 |
| 55 | INTEREST (INCOME) | BY | SH | 41 |
| 56 | COLLECTION LOAN AND INTEREST | FM | BY | 42 |
| 57 | PURCHASE OF SECURITIES | BR | BR | 39 |
| 58 | BROKER'S FEES AND SERVICES | SH | BR | 40 |
| 59 | PAYMENT TO BROKER | BR | FM | 43 |
| 60 | COSTING OF SECURITIES SOLD | FM | SH | 44 |
| 61 | SALE OF SECURITIES | BY | FM | 45 |
| 62 | INVOICE DELIVERED SECURITIES | FM | BY | 40 |
| 63 | COLLECTION OF SECURITIES SOLD | SH | GT | 37 |
| 64 | INCOME TAX | GT | FM | 40 |
| 65 | PAYMENT OF INCOME TAX | EM | EM | 46 |
| 66 | DECLARING DIVIDENDS | SH | SH | 47 |
| 67 | DIVIDENDS "PAID" IN SHARES | EM | FM | 40 |
| 68 | DIVIDENDS PAID IN CASH | BY | SH | 41 |
| 69 | INTEREST EARNED ON CASH | FM | EM | |

FIG. 4B

| | | BALANCE SHEET | | | |
|---|---|---|---|---|---|
| DATE: | | | HOUR | | |
| + | | ASSETS | + | − | + |
| 50 | FM | CASH | | | 50 |
| | BY | TRADE RECEIVABLES | | | |
| | BY | OTHER RECEIVABLES | | | |
| | FM | SECURITIES | | | |
| | MM | MATERIALS/ENERGY/PROD. | | | |
| | MM | MATERIALS/ENERGY/ADMIN. | | | |
| | WM | WORK/SERVICES/PRODUCT | | | |
| | WM | WORK/SERVICES/ADMINIST. | | | |
| | PM | PRODUCTS IN PROCESS | | | |
| | SM | PRODUCTS FINISHED | | | |
| 2 | TM | TECHNOL PRODUCTION | | | 2 |
| 0 | TM | TECHNOL ADMINISTRATION | | 1 | 1 |
| | TM | EQUIPMENT PRODUCTION | | | |
| | TM | EQUIPMENT ADMINISTRATION | | | |
| 52 | | TOTAL ASSETS | | 1 | 53 |
| + | | LIABILITIES & EQUITY | − | + | + |
| | BK | BANK/CREDITOR PAYABLE | | | |
| | MS | MATERIALS/ENERGY/PAY. | | | |
| | WS | EMPLOYEES PAYABLES | | | |
| | WS | SERVICES PAYABLE | | | |
| | GT | WITHOLDINGS PAYABLE | | | |
| | GT | CONSUMER TAX PAYABLE | | | |
| 2 | TS | TECH/EQUIP. PAYABLES | | 1 | 3 |
| | BR | BROKER PAYABLE | | | |
| | GT | INCOME TAX PAYABLE | | | |
| 50 | SH | SHAREHOLDER'S INVESTMT. | | | 50 |
| | SH | PROFIT RETAINED | | | |
| 52 | | TOTAL LIABILITY/EQUITY | | 1 | 53 |
| + | | PROFIT (INCOME) STATEMENT | − | + | + |
| | SH | SALES (NET) | | + | + |
| | SH | LESS: COST OF SALES | − | | − |
| | | GROSS PROFIT | | | |
| | SH | TECHN. ADMIN. −amort     a | − | | − |
| | SH | EQUIP. ADMIN. −deprec.  d | − | | − |
| | SH | MATERIALS ADMIN. −used  m | − | | − |
| | SH | ENERGY ADMIN. −used     e | − | | − |
| | SH | WORK ADMIN. −used       w | − | | − |
| | SH | SERVICES ADMIN. −used   s | − | | − |
| | SH | INTEREST EXPENSE/INCOME | − | + | |
| | SH | INCOME FROM SECURITIES | − | + | |
| | SH | BROKERAGE SERVICE | − | | |
| | | NET INCOME BEFORE TAX | | | |
| | SH | LESS TAXES | − | | − |
| | SH | NET INCOME AFTER TAX | | | |

NOTES

| # | TRANSACTION | DEBIT | CREDIT | CARD | VALUE |
|---|---|---|---|---|---|
| 01 | INVESTMENT BY SHAREHOLDER | FM | SH | | 40 |
| 02 | PURCHASE TECHNOL. PRODUCTION | TM | TS | | 01 |
| 03 | PURCHASE TECHNOL. ADMINISTRATION | TM | TS | | 07 |
| 04 | PURCHASE EQUIPM. PRODUCTION | TM | TS | | 02 |
| 05 | PURCHASE EQUIPM. ADMINISTR. | TM | TS | | 08 |
| 06 | PAYMENT TECH/EQUIP. SUPPLIER | TS | FM | | 40 |
| 07 | USE TECH. PROD.–amortization a | PM | TM | | 13 |
| 08 | USE TECH. ADM.–amortization a | SH | TM | | 19 |
| 09 | USE EQUIP. PROD.–depreciation d | PM | TM | | 14 |
| 10 | USE EQUIP. ADM.–depreciation d | SH | TM | | 20 |
| 11 | | | | | |
| 12 | PURCHASE MATERIALS PRODUCTION | MM | MS | | 03 |
| 13 | PURCHASE MATERIALS ADMINISTR. | MM | MS | | 09 |
| 14 | PURCHASE ENERGY PRODUCTION | MM | MS | | 04 |
| 15 | PURCHASE ENERGY ADMINISTR. | MM | MS | | 10 |
| 16 | PAYMENT MAT/ENERGY SUPPLIER | MS | FM | | 40 |
| 17 | USE MATERIALS PRODUCTION m | PM | MM | | 15 |
| 18 | USE MATERIALS ADMINISTRATION m | SH | MM | | 21 |
| 19 | USE ENERGY IN PRODUCTION e | PM | MM | | 16 |
| 20 | USE ENERGY ADMINISTRATION e | SH | MM | | 22 |
| 21 | "PURCHASE" WORK PRODUCTION | WM | WS | | 05 |
| 22 | "PURCHASE" WORK ADMINISTRATION | WM | WS | | 11 |
| 23 | GT WITHHOLDINGS PRODUCTION | WS | GT | | 35 |
| 24 | GT WITHHOLDINGS ADMINISTR. | WS | GT | | 35 |
| 25 | PAYMENT (NET) EMPLOYEES PROD. | WS | FM | | 40 |
| 26 | PAYMENT (NET) EMPLOYEES ADMIN. | WS | FM | | 40 |
| 27 | PAYMENT GT WITHHOLDINGS | GT | FM | | 40 |
| 28 | USE WORK IN PRODUCTION w | PM | WM | | 17 |
| 29 | USE WORK IN ADMINISTRATION w | SH | WM | | 23 |
| 30 | PURCHASE SERVICES PRODUCTION | WM | WS | | 06 |
| 31 | PURCHASE SERVICES ADMINISTR. | WM | WS | | 12 |
| 32 | TAX ON SERVICES PRODUCTION | GT | GT | | 36 |
| 33 | TAX ON SERVICES ADMINISTRATION | GT | GT | | 36 |
| 34 | PAY (NET) SERVICES SUPPLIERS | FM | FM | | 40 |
| 35 | PAYMENT TAXES ON SERVICES | GT | FM | | 40 |
| 36 | USE SERVICE IN PRODUCTION s | PM | WM | | 18 |
| 37 | USE SERVICE IN ADMINISTR. s | SH | WM | | 24 |
| 38 | WAREHOUSING FIN. PRODUCT | SM | PM | | 25 |
| 39 | WAREHOUSING FIN. PRODUCT a | SM | PM | | 26 |
| 40 | WAREHOUSING FIN. PRODUCT m | SM | PM | | 27 |
| 41 | WAREHOUSING FIN. PRODUCT e | SM | PM | | 28 |
| 42 | WAREHOUSING FIN. PRODUCT w | SM | PM | | 29 |
| 43 | WAREHOUSING FIN. PRODUCT s | SM | PM | | 30 |
| 44 | COSTING FIN. PRODUCT SOLD | SH | SM | | 31 |
| 45 | SALE OF FINISHED PRODUCT | BY | SH | | 32 |
| 46 | INVOICE DELIVERED PRODUCTS | BY | SM | | 33 |
| 47 | CONSUMER TAX OR VAT | BY | GT | | 34 |
| 48 | COLLECTION OF INVOICES | FM | BY | | 40 |
| 49 | PAYMEN. CONSUMER TAX OR VAT | GT | FM | | 40 |
| 50 | LOAN RECIEVED FROM BANK | FM | BK | | 40 |
| 51 | INTEREST (EXPENSE) | SH | BK | | 38 |
| 52 | PAYMENT OF LOAN AND INTEREST | BK | FM | | 40 |
| 53 | LOAN GIVEN/PAYMENT | BY | FM | | 40 |
| 54 | INTEREST (INCOME) | BY | SH | | 41 |
| 55 | COLLECTION LOAN AND INTEREST | FM | BY | | 40 |
| 56 | PURCHASE OF SECURITIES | FM | FM | | 42 |
| 57 | BROKER'S FEES AND SERVICES | BR | BR | | 39 |
| 58 | PAYMENT TO BROKER | BR | FM | | 40 |
| 59 | COSTING OF SECURITIES SOLD | SH | FM | | 43 |
| 60 | SALE OF SECURITIES | BY | SH | | 44 |
| 61 | INVOICE DELIVERED SECURITIES | BY | FM | | 45 |
| 62 | COLLECTION OF SECURITIES SOLD | FM | BY | | 40 |
| 63 | INCOME TAX | SH | GT | | 37 |
| 64 | PAYMENT OF INCOME TAX | GT | FM | | 40 |
| 65 | DECLARING DIVIDENDS | SH | SH | | 46 |
| 66 | DIVIDENDS "PAID" IN SHARES | SH | SH | | 47 |
| 67 | DIVIDENDS PAID IN CASH | SH | FM | | 40 |
| 68 | INTEREST EARNED ON CASH | FM | SH | | 41 |

| | | BALANCE SHEET | | | |
|---|---|---|---|---|---|
| DATE: | | | HOUR | | |
| + | | ASSETS | + | − | + |
| 47 | FM | CASH | | | 47 |
| | BY | TRADE RECEIVABLES | | | |
| | BY | OTHER RECEIVABLES | | | |
| 0 | FM | SECURITIES | 9 | | 9 |
| 1 | MM | MATERIALS/ENERGY/PROD. | | | 1 |
| | MM | MATERIALS/ENERGY/ADMIN. | | | |
| | WM | WORK/SERVICES/PRODUCT | | | |
| | WM | WORK/SERVICES/ADMINIST. | | | |
| | PM | PRODUCTS IN PROCESS | | | |
| | SM | PRODUCTS FINISHED | | | |
| 1 | TM | TECHNOL. PRODUCTION | | | 1 |
| | TM | TECHNOL. ADMINISTRATION | | | |
| 8 | TM | EQUIPMENT PRODUCTION | | | 8 |
| 3 | TM | EQUIPMENT ADMINISTRATION | | | 3 |
| 60 | | TOTAL ASSETS | 9 | | 69 |
| + | | LIABILITIES & EQUITY | − | + | + |
| | BK | BANK/CREDITOR PAYABLE | | | |
| | MS | MATERIALS/ENERGY/PAY. | | | |
| | WS | EMPLOYEES PAYABLES | | | |
| | WS | SERVICES PAYABLE | | | |
| | GT | WITHHOLDINGS PAYABLE | | | |
| | GT | CONSUMER TAX PAYABLE | | | |
| | TS | TECH./EQUIP. PAYABLES | | | |
| 0 | BR | BROKER PAYABLE | | 9 | 9 |
| | GT | INCOME TAX PAYABLE | | | |
| 50 | SH | SHAREHOLDER'S INVESTMT. | | | 50 |
| 10 | SH | PROFIT RETAINED | | | 10 |
| 60 | | TOTAL LIABILITY/EQUITY | | 1 | 69 |
| + | | PROFIT (INCOME) STATEMENT | − | + | + |
| 38 | SH | SALES (NET) | | + | +38 |
| −19 | SH | LESS: COST OF SALES | − | | −19 |
| | | GROSS PROFIT | | | |
| −1 | SH | TECHN. ADMIN. −amort    a | − | | −1 |
| −1 | SH | EQUIP. ADMIN. −deprec.  d | − | | −1 |
| −1 | SH | MATERIALS ADMIN. −used  m | − | | −1 |
| −1 | SH | ENERGY ADMIN. −used     e | − | | −1 |
| −3 | SH | WORK ADMIN. −used       w | − | | −3 |
| −2 | SH | SERVICES ADMIN. −used   s | − | | −2 |
| | SH | INTEREST EXPENSE/INCOME | − | + | |
| | SH | INCOME FROM SECURITIES | − | + | |
| | SH | BROKERAGE SERVICE | − | | |
| 10 | | NET INCOME BEFORE TAX | | | 10 |
| | SH | LESS TAXES | − | | − |
| | SH | NET INCOME AFTER TAX | | | |

NOTES

FIG. 5D

| | TRANSACTION | DEBIT | CREDIT | CARD VALUE |
|---|---|---|---|---|
| 01 | INVESTMENT BY SHAREHOLDER | FM | SH | 40 |
| 02 | PURCHASE TECHNOL. PRODUCTION | TM | TS | 01 |
| 03 | PURCHASE TECHNOL. ADMINISTRATION | TM | TS | 07 |
| 04 | PURCHASE EQUIPM. PRODUCTION | TM | TS | 02 |
| 05 | PURCHASE EQUIPM. ADMINISTR. | TM | TS | 08 |
| 06 | PAYMENT TECH/EQUIP. SUPPLIER | TS | FM | 40 |
| 07 | USE TECH. PROD.-amortization a | PM | TM | 13 |
| 08 | USE TECH. ADM.-amortization a | SH | TM | 19 |
| 09 | USE EQUIP. PROD.-depreciation d | PM | TM | 14 |
| 10 | USE EQUIP. ADM.-depreciation d | SH | TM | 20 |
| 11 | | | | |
| 12 | PURCHASE MATERIALS PRODUCTION | MM | MS | 03 |
| 13 | PURCHASE MATERIALS ADMINISTR. | MM | MS | 09 |
| 14 | PURCHASE ENERGY PRODUCTION | MM | MS | 04 |
| 15 | PURCHASE ENERGY ADMINISTR. | MM | MS | 10 |
| 16 | PAYMENT MAT./ENERGY SUPPLIER | MS | FM | 40 |
| 17 | USE MATERIALS PRODUCTION m | PM | MM | 15 |
| 18 | USE MATERIALS ADMINISTRATION m | SH | MM | 21 |
| 19 | USE ENERGY PRODUCTION e | PM | MM | 16 |
| 20 | USE ENERGY ADMINISTRATION e | SH | MM | 22 |
| 21 | "PURCHASE" WORK PRODUCTION | WM | WS | 05 |
| 22 | "PURCHASE" WORK ADMINISTRATION | WM | WS | 11 |
| 23 | GT WITHHOLDINGS PRODUCTION | WS | GT | 35 |
| 24 | GT WITHHOLDINGS ADMINISTR. | WS | GT | 35 |
| 25 | PAYMENT (NET) EMPLOYEES PROD. | WS | FM | 40 |
| 26 | PAYMENT (NET) EMPLOYEES ADMIN. | WS | FM | 40 |
| 27 | PAYMENT GT WITHHOLDINGS | GT | FM | 40 |
| 28 | USE WORK IN PRODUCTION w | PM | WM | 17 |
| 29 | USE WORK IN ADMINISTRATION w | SH | WM | 23 |
| 30 | PURCHASE SERVICES PRODUCTION | WM | WS | 06 |
| 31 | PURCHASE SERVICES ADMINISTR. | WM | WS | 12 |
| 32 | TAX ON SERVICES PRODUCTION | WS | GT | 36 |
| 33 | TAX ON SERVICES ADMINISTRATION | WS | GT | 36 |
| 34 | PAY (NET) SERVICES SUPPLIERS | WS | FM | 40 |
| 35 | PAYMENT TAXES ON SERVICES | GT | FM | 40 |
| 36 | USE SERVICE IN PRODUCTION s | PM | WM | 18 |
| 37 | USE SERVICE IN ADMINISTR. s | SH | WM | 24 |
| 38 | WAREHOUSING FIN. PRODUCT o | SM | PM | 25 |
| 39 | WAREHOUSING FIN. PRODUCT d | SM | PM | 26 |
| 40 | WAREHOUSING FIN. PRODUCT | SM | PM | 27 |
| 41 | WAREHOUSING FIN. PRODUCT m | SM | PM | 28 |
| 42 | WAREHOUSING FIN. PRODUCT e | SM | PM | 29 |
| 43 | WAREHOUSING FIN. PRODUCT w | SM | PM | 30 |
| 44 | COSTING FIN. PRODUCT SOLD s | SH | SM | 31 |
| 45 | SALE OF FINISHED PRODUCT | BY | SM | 32 |
| 46 | INVOICE DELIVERED PRODUCTS | BY | GT | 33 |
| 47 | CONSUMER TAX OR VAT | | | 34 |
| 48 | | | | |
| 49 | COLLECTION OF INVOICES | FM | BY | 40 |
| 50 | PAYMENT CONSUMER TAX OR VAT | GT | FM | 40 |
| 51 | LOAN RECEIVED FROM BANK | FM | BK | 40 |
| 52 | INTEREST (EXPENSE) | SH | BK | 38 |
| 53 | PAYMENT OF LOAN AND INTEREST | BK | FM | 40 |
| 54 | LOAN GIVEN/PAYMENT | BY | FM | 40 |
| 55 | INTEREST (INCOME) | BY | SH | 41 |
| 56 | COLLECTION LOAN AND INTEREST | FM | BY | 40 |
| 57 | PURCHASE OF SECURITIES | BR | FM | 42 |
| 58 | BROKER'S FEES AND SERVICES | BR | FM | 39 |
| 59 | PAYMENT TO BROKER | FM | BR | 40 |
| 60 | COSTING OF SECURITIES SOLD | SH | BR | 43 |
| 61 | SALE OF SECURITIES | BY | FM | 44 |
| 62 | INVOICE DELIVERED SECURITIES | BY | SH | 45 |
| 63 | COLLECTION OF SECURITIES SOLD | FM | BY | 40 |
| 64 | INCOME TAX | SH | GT | 37 |
| 65 | PAYMENT OF INCOME TAX | GT | FM | 40 |
| 66 | DECLARING DIVIDENDS | SH | BR | 46 |
| 67 | DIVIDENDS "PAID" IN SHARES | SH | FM | 47 |
| 68 | DIVIDENDS PAID IN CASH | FM | BY | 40 |
| 69 | INTEREST EARNED ON CASH | FM | SH | 41 |
| 70 | | | | 6 |

FIG. 6B

| | | BALANCE SHEET | | | |
|---|---|---|---|---|---|
| | DATE: | | | HOUR | |
| + | | ASSETS | + | − | + |
| 46 | FM | CASH | | | 46 |
| | BY | TRADE RECEIVABLES | | | |
| | BY | OTHER RECEIVABLES | | | |
| | FM | SECURITIES | | | |
| 1 | MM | MATERIALS/ENERGY/PROD. | | | 1 |
| | MM | MATERIALS/ENERGY/ADMIN. | | | |
| | WM | WORK/SERVICES/PRODUCT | | | |
| | WM | WORK/SERVICES/ADMINIST. | | | |
| | PM | PRODUCTS IN PROCESS | | | |
| | SM | PRODUCTS FINISHED | | | |
| 1 | TM | TECHNOL. PRODUCTION | | | 1 |
| | TM | TECHNOL. ADMINISTRATION | | | |
| 8 | TM | EQUIPMENT PRODUCTION | | | 8 |
| 3 | TM | EQUIPMENT ADMINISTRATION | | | 3 |
| 59 | | TOTAL ASSETS | | | 59 |
| + | | LIABILITIES & EQUITY | − | + | + |
| | BK | BANK/CREDITOR PAYABLE | | | |
| | MS | MATERIALS/ENERGY/PAY. | | | |
| | WS | EMPLOYEES PAYABLES | | | |
| | WS | SERVICES PAYABLE | | | |
| | GT | WITHOLDINGS PAYABLE | | | |
| | GT | CONSUMER TAX PAYABLE | | | |
| | TS | TECH/EQUIP. PAYABLES | | | |
| | BR | BROKER PAYABLE | | | |
| | GT | INCOME TAX PAYABLE | | | |
| 50 | SH | SHAREHOLDER'S INVESTMT. | | | 50 |
| 9 | SH | PROFIT RETAINED | 6 | 6 | 9 |
| 59 | | TOTAL LIABILITY/EQUITY | 6 | 6 | 69 |
| + | | PROFIT (INCOME) STATEMENT | − | + | + |
| 38 | SH | SALES (NET) | | + | +38 |
| −19 | SH | LESS: COST OF SALES | − | | −19 |
| | | GROSS PROFIT | | | |
| −1 | SH | TECHN. ADMIN. −amort    a | − | | −1 |
| −1 | SH | EQUIP. ADMIN. −deprec.  d | − | | −1 |
| −1 | SH | MATERIALS ADMIN. −used  m | − | | −1 |
| −1 | SH | ENERGY ADMIN. −used     e | − | | −1 |
| −3 | SH | WORK ADMIN. −used       w | − | | −3 |
| −2 | SH | SERVICES ADMIN. −used   s | − | | −2 |
| | SH | INTEREST EXPENSE/INCOME | − | + | |
| 3 | SH | INCOME FROM SECURITIES | − | + | 3 |
| −1 | SH | BROKERAGE SERVICE | − | | −1 |
| 12 | | NET INCOME BEFORE TAX | | | 12 |
| −3 | SH | LESS TAXES | − | | −3 |
| 9 | SH | NET INCOME AFTER TAX | | | 9 |

NOTES

FIG. 6D

| | TRANSACTION | DEBIT | CREDIT | CARD | VALUE |
|---|---|---|---|---|---|
| 01 | INVESTMENT BY SHAREHOLDER | FM | SH | 40 | 50 |
| 02 | PURCHASE TECHNOL. PRODUCTION | TM | TS | 01 | 2 |
| 03 | PURCHASE TECHNOL. ADMINISTRATION | TM | TS | 07 | 1 |
| 04 | PURCHASE EQUIPM. PRODUCTION | TM | TS | 02 | 10 |
| 05 | PURCHASE EQUIPM. ADMINISTR. | TM | TS | 08 | 4 |
| 06 | PAYMENT TECH/EQUIP. SUPPLIER | TS | FM | 40 | 17 |
| 07 | USE TECH. PROD.-amortization—a | PM | TM | 13 | 3 |
| 08 | USE TECH. ADM.-amortization—a | SH | TM | 19 | 1 |
| 09 | USE EQUIP. PROD.-depreciation—d | PM | TM | 14 | 2 |
| 10 | USE EQUIP. ADM.-depreciation—d | SH | TM | 20 | 1 |
| 11 | | | | | |
| 12 | PURCHASE MATERIALS PRODUCTION | MM | MS | 03 | 8 |
| 13 | PURCHASE MATERIALS ADMINISTR. | MM | MS | 09 | 1 |
| 14 | PURCHASE ENERGY PRODUCTION | MM | MS | 04 | 2 |
| 15 | PURCHASE ENERGY ADMINISTR. | MM | MS | 10 | 2 |
| 16 | PAYMENT MAT./ENERGY SUPPLIER | MS | FM | 40 | 12 |
| 17 | USE MATERIALS PRODUCTION—m | PM | MM | 15 | 7 |
| 18 | USE MATERIALS ADMINISTRATION—m | SH | MM | 21 | 1 |
| 19 | USE ENERGY IN PRODUCTION—e | PM | MM | 16 | 2 |
| 20 | USE ENERGY ADMINISTRATION—e | SH | MM | 22 | 2 |
| 21 | "PURCHASE" WORK PRODUCTION | WM | WS | 05 | 4 |
| 22 | "PURCHASE" WORK ADMINISTRATION | WM | WS | 11 | 3 |
| 23 | GT WITHHOLDINGS PRODUCTION | WS | GT | 35 | 2 |
| 24 | GT WITHHOLDINGS ADMINISTR. | WS | GT | 35 | 1 |
| 25 | PAYMENT (NET) EMPLOYEES PROD. | WS | FM | 40 | 2 |
| 26 | PAYMENT (NET) EMPLOYEES ADMIN. | WS | FM | 40 | 2 |
| 27 | PAYMENT GT WITHHOLDINGS | GT | FM | 40 | 3 |
| 28 | USE WORK IN PRODUCTION—w | PM | WM | 17 | 4 |
| 29 | USE WORK IN ADMINISTRATION—w | SH | WM | 23 | 3 |
| 30 | PURCHASE SERVICES PRODUCTION | WS | WS | 06 | 3 |
| 31 | PURCHASE SERVICES ADMINISTR. | WS | WS | 12 | 1 |
| 32 | TAX ON SERVICES PRODUCTION | WS | GT | 36 | 1 |
| 33 | TAX ON SERVICES ADMINISTRATION | WS | GT | 36 | 1 |
| 34 | PAY (NET) SERVICES SUPPLIERS | WS | FM | 40 | 3 |
| 35 | PAYMENT TAXES ON SERVICES | GT | FM | 40 | 2 |
| 36 | USE SERVICE IN PRODUCTION—s | PM | WM | 18 | 3 |
| 37 | USE SERVICE IN ADMINISTR.—s | SH | WM | 24 | 2 |
| 38 | WAREHOUSING FIN. PRODUCT—a | PM | SM | 25 | 1 |
| 39 | WAREHOUSING FIN. PRODUCT—d | PM | SM | 26 | 2 |
| 40 | WAREHOUSING FIN. PRODUCT—m | PM | SM | 27 | 7 |
| 41 | WAREHOUSING FIN. PRODUCT—e | PM | SM | 28 | 2 |
| 42 | WAREHOUSING FIN. PRODUCT—w | PM | SM | 29 | 4 |
| 43 | WAREHOUSING FIN. PRODUCT—s | PM | SM | 30 | 3 |
| 44 | COSTING FIN. PRODUCT SOLD | SM | SH | 31 | 19 |
| 45 | SALE OF FINISHED PRODUCT | BY | SM | 32 | 38 |
| 46 | INVOICE DELIVERED PRODUCTS | BY | SM | 33 | 38 |
| 47 | CONSUMER TAX OR VAT | BY | GT | 34 | 2 |
| 48 | | | | | |
| 49 | COLLECTION OF INVOICES | FM | BY | 40 | 40 |
| 50 | PAYMENT CONSUMER TAX OR VAT | GT | FM | 40 | 2 |
| 51 | LOAN RECIEVED FROM BANK | FM | BK | 40 | 15 |
| 52 | INTEREST (EXPENSE) | SH | BK | 38 | 1 |
| 53 | PAYMENT OF LOAN AND INTEREST | BK | FM | 40 | 16 |
| 54 | LOAN GIVEN/PAYMENT | BY | FM | 40 | 10 |
| 55 | INTEREST (INCOME) | BY | SH | 41 | 1 |
| 56 | COLLECTION LOAN AND INTEREST | FM | BY | 40 | 11 |
| 57 | PURCHASE OF SECURITIES | BR | FM | 42 | 9 |
| 58 | BROKER'S FEES AND SERVICES | SH | BR | 39 | 1 |
| 59 | PAYMENT TO BROKER | BR | FM | 40 | 10 |
| 60 | COSTING OF SECURITIES SOLD | FM | BK | 40 | 12 |
| 61 | SALE OF SECURITIES | FM | SH | 43 | 12 |
| 62 | INVOICE DELIVERED SECURITIES | BY | FM | 44 | 12 |
| 63 | COLLECTION OF SECURITIES SOLD | FM | BY | 45 | 12 |
| 64 | INCOME TAX | SH | GT | 37 | 3 |
| 65 | PAYMENT OF INCOME TAX | GT | FM | 40 | 3 |
| 66 | DECLARING DIVIDENDS | SH | SH | 46 | 6 |
| 67 | DIVIDENDS PAID IN SHARES | SH | SH | 47 | 4 |
| 68 | DIVIDENDS PAID IN CASH | SH | FM | 40 | 2 |
| 69 | INTEREST EARNED ON CASH | FM | SH | 41 | 2 |

FIG. 7B

| | | BALANCE SHEET | | | |
|---|---|---|---|---|---|
| | DATE: | | | HOUR | |
| + | | ASSETS | + | − | + |
| 0 | FM | CASH | 128 | 84 | 44 |
| 0 | BY | TRADE RECEIVABLES | 40 | 40 | 0 |
| 0 | BY | OTHER RECEIVABLES | 23 | 23 | 0 |
| 0 | FM | SECURITIES | 21 | 21 | 0 |
| 0 | MM | MATERIALS/ENERGY/PROD. | 10 | 9 | 1 |
| 0 | MM | MATERIALS/ENERGY/ADMIN. | 2 | 2 | 0 |
| 0 | WM | WORK/SERVICES/PRODUCT | 7 | 7 | 0 |
| 0 | WM | WORK/SERVICES/ADMINIST. | 5 | 5 | 0 |
| 0 | PM | PRODUCTS IN PROCESS | 19 | 19 | 0 |
| 0 | SM | PRODUCTS FINISHED | 57 | 57 | 0 |
| 0 | TM | TECHNOL PRODUCTION | 2 | 1 | 1 |
| 0 | TM | TECHNOL ADMINISTRATION | 1 | 4 | 0 |
| 0 | TM | EQUIPMENT PRODUCTION | 10 | 2 | 8 |
| 0 | TM | EQUIPMENT ADMINISTRATION | 4 | 1 | 3 |
| 0 | | TOTAL ASSETS | 329 | 272 | 57 |
| + | | LIABILITIES & EQUITY | − | + | + |
| 0 | BK | BANK/CREDITOR PAYABLE | 16 | 16 | 0 |
| 0 | MS | MATERIALS/ENERGY/PAY. | 12 | 12 | 0 |
| 0 | WS | EMPLOYEES PAYABLES | 7 | 7 | 0 |
| 0 | WS | SERVICES PAYABLE | 5 | 5 | 0 |
| 0 | GT | WITHOLDINGS PAYABLE | 5 | 5 | 0 |
| 0 | GT | CONSUMER TAX PAYABLE | 2 | 2 | 0 |
| 0 | TS | TECH/EQUIP. PAYABLES | 17 | 17 | 0 |
| 0 | BR | BROKER PAYABLE | 10 | 10 | 0 |
| 0 | GT | INCOME TAX PAYABLE | 3 | 3 | 0 |
| 0 | SH | SHAREHOLDER'S INVESTMT. | | 54 | 54 |
| 0 | SH | PROFIT RETAINED | 54 | 57 | 3 |
| | | TOTAL LIABILITY/EQUITY | 134 | 188 | 57 |
| + | | PROFIT (INCOME) STATEMENT | − | + | + |
| 0 | SH | SALES (NET) | | +38 | +38 |
| 0 | SH | LESS: COST OF SALES | −19 | | −19 |
| | | GROSS PROFIT | | | |
| 0 | SH | TECHN. ADMIN. −amort   a | −1 | | −1 |
| 0 | SH | EQUIP. ADMIN. −deprec.  d | −1 | | −1 |
| 0 | SH | MATERIALS ADMIN. −used  m | −1 | | −1 |
| 0 | SH | ENERGY ADMIN. −used  e | −1 | | −1 |
| 0 | SH | WORK ADMIN. −used  w | −3 | | −3 |
| 0 | SH | SERVICES ADMIN. −used  s | −2 | | −2 |
| 0 | SH | INTEREST EXPENSE/INCOME | −1 | +1 | 0 |
| 0 | SH | INCOME FROM SECURITIES | −9 | +12 | 3 |
| 0 | SH | BROKERAGE SERVICE | −1 | | −1 |
| 0 | | NET INCOME BEFORE TAX | | | |
| 0 | SH | LESS TAXES | −3 | | −3 |
| 0 | SH | NET INCOME AFTER TAX | 42 | | 9 |

NOTES

FIG. 7D

METHOD FOR TEACHING ECONOMICS, MANAGEMENT AND ACCOUNTING

REFERENCE TO RELATED PATENT APPLICATION

This application claims the benefit of U. S. Provisional Patent Application Ser. No. 60/130,658, filed on Apr. 23, 1999.

BACKGROUND OF THE INVENTION

1. Field of the Invention

The present invention relates generally to teaching methods, and more specifically to a method for teaching economics or business practices involving a "virtual enterprise,, simulation (pictorial and/or live). Persons involved take the roles of various "stakeholders," i.e., corporate managers, clients, shareholders, contractors, etc., during training sessions. The records of transactions taking place during the course of a training session may be kept on specially formatted sheets, on an electronic version thereof, or by means of a computer program, to provide essentially instantaneous information relating to the progress of the simulated business during a teaching session. The present invention may be extended to include a method or means of performing business and other transactions as well.

2. Description of the Related Art

Economics, management and accounting are generally considered to be relatively complex fields of science, with a full understanding generally being considered to be achieved only by means of an advanced curriculum in a college or university, and perhaps with further practical experience. The methods for teaching such subjects are generally relegated to the classroom and by conventional textbooks and the like. Such methods conventionally used, generally fail to show clearly the economic effects of each transaction on those involved in a business or economic relationship.

Yet, it will be seen that every business transaction affects the economic status of each "stakeholder" in an enterprise of any sort; conventional teaching and accounting methods do not show these relationships, and result in a relatively complex picture of the enterprise, its balance sheet, and its profit and loss statement. Traditional financial or economic games (e.g., Monopoly, ™) do not provide a complete picture of the various effects of business or economic transactions in the real world. Such games are competitive in themselves and involve winning and losing players, rather than being directed to the teaching of business and/or economic theory and practice, as accomplished by the present inventive method.

Traditional teaching methods of the closely interrelated disciplines of economics, management, and accounting, continue to be relatively abstract and are not easily and fully understood by students in those fields. The use of computer technology for the purpose of more rapid comprehension of these theories and practices, has not been fully developed at present. As a result of the generally prevailing segmentation of knowledge in these fields, a person may spend years of study unnecessarily. Further, the present state of the art in the domain of economics and social sciences may be such that, unless it changes, will never provide a common knowledge base required by people everywhere to upgrade their life standards. Present systems result in people being unnecessarily dependent upon government and specialized professional assistance in these fields.

Accordingly, a need will be seen for a method for teaching and simulating economic and/or business processes, which places responsible parties in realistic roles during the training session. A table of transactions and a series of transaction cards are provided, each describing a business or economic scenario of some sort. The results of each transaction are manually recorded on transaction sheets, or may alternatively be recorded electronically or by means of a computer program developed for the present teaching system. In the present teaching system, every transaction affects the economic status of each of the "stakeholders" involved, and this is instantaneously shown in all pertinent accounts and financial statements of the enterprise.

The present non-competitive game of enterprise economics is a teaching method that uses both common human intelligence and computer technology to promote social and economic well being far beyond any historic precedence. This method may also demystify the concept of science itself, in that it provides an almost instant understanding of economic phenomena and related organizational and sociological imperatives to work, earn, produce, consume, and invest in the future.

This teaching method may well reduce years of study, to only days of study generally needed to fully understand the economic process at all levels of society, i.e., family, enterprise, community, state, and beyond. The present method and system thus fill a historic gap in human science to provide improvements in well being for all mankind, and thus contribute significantly to a generalized and globalized human progress and thereby strengthen the prospects of lasting peace on our planet.

The present method and system is not applicable only to the teaching of economics and related fields, but may also be applied to business and economic transactions themselves, as will be seen in a review of the following disclosure. Use of the present system in business and other transactions results in a simplification of the processes involved and a clearer understanding of all of the elements of a given transaction as well.

A discussion of the related art of which the present inventor is aware, and its differences and distinctions from the present invention, is provided below.

U.S. Pat. No. 4,150,827 issued on Apr. 24, 1979 to David A. J. Barnett, titled "Economic Board Game," describes a game in which players are randomly selected and use chance means (dice, etc.) to determine the course of each play. The game is played upon a single playing board, which shows various tables of values for a plurality of business opportunities which are selected depending upon the outcome of the play. Cards are used to indicate the general economic status of a given business during play. The present method differs in that (1) it is not a simple game, but more than that, it is an overall business practice teaching method; (2) each participant in the present teaching system acts in a different role (e.g., materials manager, shareholder, etc.) for a single economic enterprise, rather than each player acting as CEO of a different business; (3) there is no competitive aspect to the present system, but rather a teaching of the flow or interaction of transactions between participants; and (4) a separate sheet or page (hard copy, computer, etc.) is used for each transaction in the present teaching system, rather than using a single game board for the entire session.

U.S. Pat. No. 4,289,313 issued on Sep. 15, 1981 to Robert P. Delamontagne, titled "Management Teaching Game Apparatus And Method," describes a board game in which two players are required to answer questions during play, and are rewarded with simulated money for correct answers. Advance during play is determined by chance. The game is competitive, with the player collecting the largest sum of simulated money, being the winner. In contrast, the present economics, management and accounting teaching method is played by a team of participants (ideally sixteen to twenty two persons). The present economics and business teaching method is not competitive, with all participants acting or serving in roles as stakeholders in a single corporation or enterprise. While the transaction cards of the present teaching system may be drawn randomly, they are precoded and listed in logical sequence for better understanding of actual business practices. The transactions are specifically spelled out and clearly indicated, with no requirement for additional responses from participants. Each transaction is logged separately in the present teaching system, with participants thus developing a clear concept of the factors involved in each transaction.

U.S. Pat. No. 4,452,457 issued on Jun. 5, 1984 to Sabah Atieh et al., titled "Financial Board Game, " describes a board game simulating the trading of stock in a corporation. While a stock or dividend transaction is a part of the present teaching method, the present method does not rely upon such, but rather is directed primarily to various internal and external transactions in a corporate enterprise, to show the interrelationship between different positions in the enterprise as well as different external factors depending upon the transaction. Accordingly, each transaction is entered separately, rather than using a single game board and playing path thereon, as in the Atieh et al. game. Again, as noted further above, the present method or system is not a simple competition between two players or teams, and no winners or losers are determined by any competitive means, as opposed to the Atieh et al. game and others of the prior art.

U.S. Pat. No. 4,501,425 issued on Feb. 26, 1985 to Daniel D. Alvarado, titled "Business Organization Game," describes a game having two playing paths. One path provides for the simulated advance of players up the corporate staff hierarchy, while the other simulates financial gain by players during the course of play. Chance means is used to determine advance along the second playing path. In contrast, all participants in the present economics teaching method retain their positions throughout each session, and do not accrue any simulated wealth during the course of the session. Rather, they engage in various internal (within the corporation) and external (from the corporation to outside vendors, government, etc.) transactions, with the process showing which participants are involved in administrative responsibilities for goods and services (i.e., responsibilities for assets) and which participants experience adjustment in their rights of claim or ownership (i.e., liabilities and equity) over those same goods and services under the responsibility of management functions.

U.S. Pat. No. 5,071,135 issued on Dec. 10, 1991 to Thomas J. Campbell, titled "Board Game Apparatus For The Teaching Of Financial Management Principles," describes a game somewhat resembling the older game of "Monopoly," wherein players buy and sell properties and collect wealth by means of simulated currency. The Campbell game includes a single game board, with the playing path representing a one year period, divided into quarters. Again, the present teaching system is not a simple competitive game, but rather a means of teaching or showing participants the effects of a series of business transactions in a simulated corporation or other financial or social structure. The present system is not limited to any temporal period, either simulated or actual, and does not determine any winners or losers nor provide participants with any actual or simulated wealth, other than that accrued by the corporation by means of the transactions which occur.

U.S. Pat. No. 5,407,207 issued on Apr. 18, 1995 to Carlton R. Stanford, titled "Board Game Simulating Financial Events Of A Lifetime," describes a competitive game in which players use chance means to travel about a playing path during the course of the game. Winning and losing players are determined by the amount of simulated wealth they accrue during the course of play. Each pass around the board represents one year of elapsed time. The Stanford game thus more closely resembles the simple game described in the Campbell '135 U.S. Patent described immediately above, than the present holistically envisioned business and economics teaching method.

U.S. Pat. No. 5,788,234 issued on Aug. 4, 1988 to Artur A. Sioffer, titled "Business Board Game," describes a board game in which players attempt to secure a controlling interest in various simulated industrial cartels, in order to control prices to competing players. Simulated stock trading is also a part of the Sioffer game. As in other competitive games of which the present inventor is aware, players of the Sioffer game are competing against one another, with the winning player being the player who accrues the greatest amount of simulated wealth during the course of play. Again, the present teaching method is not such a simplistic game; does not involve travel about a path on a game board; does not involve competition between individuals; and does not determine any winners or losers in a financial sense in the course of a session. Rather, the present teaching method shows the participants the effects of various simulated business or economic transactions, on a simulated corporation in which the participants play various roles.

U.S. Pat. No. 5,826,878 issued on Oct. 27, 1998 to Robert T. Kiyosaki et al., titled "Apparatus And Method Of Playing A Board Game For Teaching Fundamental Aspects of Personal Finance, Investing And Accounting," describes a competitive game having first and second tracks which must be followed sequentially. A player may not advance to the second track until a sufficient amount of simulated wealth has been accumulated by play on the first track. Players may gain and lose wealth during the course of play on either of the tracks. The game includes income and cash flow statements and a balance sheet. While the present teaching method also includes such statements, it goes further in providing a permanent monitoring system for showing the affected parties in any transaction, for teaching the effects of various transactions upon the participants in the teaching session. Again, the present teaching system is not competitive, and no game board per se, player position markers, or chance means are provided.

U.S. Pat. No. 5,829,746 issued on Nov. 3, 1998 to John P. Pacella, titled "Investment Board Game," describes a game of chance in which various opportunities for investment or loss are provided. As in the other games described herein, the Pacella game is competitive in nature, with a winner and loser(s) being determined by the amount of simulated wealth accrued by the end of the game. Pacella does not provide any means of teaching the interactive effects of corporate transactions upon a corporation or upon the personnel of that corporation and those dealing with the corporation, as provided by the present economics teaching method.

British Patent Publication No. 1,432,761 published on Apr. 22, 1976 to Terence B. Shead et al., titled "Game," describes a board game somewhat resembling Monopoly, in that players travel around the playing path of the board and attempt to accrue simulated wealth during the course of the game. The game loosely simulates at least the adult life of one or more persons, with the game ending when one of the simulated persons is declared dead. The simulated wealth of the players is then compared, with the player having the greatest simulated wealth being the winner. No method of teaching financial transactions, or their effect upon stakeholders in a corporation, is provided by Shead et al., as taught by the present disclosure.

Finally, British Patent Publication No. 2,132,907 published on Jul. 18, 1984 to Kenneth R. Maund, titled "Board Game Apparatus," describes a competitive game simulating the automobile production and sales industry. Chance means are used for advancing playing pieces about the board, unlike the present teaching system. A "maximum production target" is established, with the winning player being the first player to reach the target, according to the game rules. As noted with the other prior art games described further above, the present teaching method differs in that it is not competitive, and does not seek or establish any financial goals for individual participants.

None of the above inventions and patents, taken either singly or in combination, is seen to describe the instant invention as claimed.

SUMMARY OF THE INVENTION

The present invention comprises a method for teaching economics or business transactions by simulating an enterprise as a "balance sheet live," i.e., a situation where actual participants are gathered in a single physical or virtual location and each is acting as an operational center (buyer, manager, supplier, etc.) and being responsible for specific aspects of the business enterprise. The present method comprises a table of predefined and preprogrammed acts of receiving (debits) and giving (credits) of goods and services symbolized by a series of coded transaction cards. Participants in the exchanges represent officials, employees, contractors, shareholders, government, bankers, and other stakeholders of a corporation. A hypothetical business transaction is selected with its corresponding transaction card which will be exchanged between two participants, with the first receiving the card and being debited for its value, and the second giving the card to the first participant and being credited for its value.

The debits and credits are entered into the monitoring system, which is essentially a summarized balance sheet, and simultaneously into conventional financial reports comprising a balance sheet, profit or income statement, and a cash flow statement. The present system shows at all times how the transactions affect the parties involved, their individual balances, and thus the changing situation of the hypothetical corporation as an entire team of participating stakeholders.

No competition is involved, nor is there any simulated accrual of individual or personal wealth or assets in the present teaching method. Rather, the present method instructs corporate officials and others in the tracking of the effects of various business and economic transactions which typically occur in the financial world, and provides a much easier and more readily visible means of determining the effects of such transactions.

Accordingly, it is a principal object of the invention to provide an improved method for teaching economics which provides various means of tracking simulated financial transactions and showing the effects of those transactions upon the parties involved.

It is another object of the invention to provide an improved method for teaching economics which is particularly applicable to the corporate or business world, for teaching various company, government, and other officials thereof.

It is a further object of the invention to provide an improved method for teaching economics including a series of transaction sheets, a corresponding series of transaction cards, a cash flow statement, a balance sheet, and a transaction sheet for showing the effects of a given transaction between the parties involved.

An additional object of the invention is to provide an improved method for teaching economics in which transaction cards are drawn singly and sequentially, with each of the cards relating to one or more specific transactions, and with the results of each transaction being entered into the various record sheets accordingly.

Still another object of the invention is to provide an improved method for teaching economics which transaction sheets, transaction cards, cash flow statement, balance sheet, and transaction table may be computerized and/or may include electronic entry means therein.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

FIG. 2B is a view of the transaction table portion of the transaction sheet partially shown in FIG. 2A, showing the corresponding transaction entry.

FIG. 2D is a view of the balance sheet and note area portion of the transaction sheet of FIGS. 2A through 2D, showing the transaction entered therein.

FIGS. 3A through 3D illustrate portions of another transaction sheet, showing the appropriate entries corresponding to another type of transaction card as shown in FIG. 3C.

FIGS. 4A through 4D illustrate portions of yet another transaction sheet, showing the appropriate entries corresponding to yet another type of transaction card as shown in FIG. 4C.

FIGS. 5A through 5D illustrate portions of still another transaction sheet, showing the appropriate entries corresponding to still another type of transaction card as shown in FIG. 5C.

FIGS. 7A through 7D show portions of a completed transaction sheet after totaling all transaction entries according to all transaction cards, showing all appropriate entries thereon.

Similar reference characters denote corresponding features consistently throughout the attached drawings.

DETAILED DESCRIPTION OF THE PREFERRED EMBODIMENTS

The present invention comprises a method or system for teaching the combined sciences of economics, management and accounting, particularly for explaining a transaction system for use in business economics. The present method is particularly valuable in teaching persons who hold various positions in business and/or government, with those persons taking corresponding positions as participants during the teaching or training session.

FIGS. 1A through 1D illustrate various portions of a transaction sheet which may be used in the teaching of the present method. (It will be understood that the portions of the sheet shown in FIGS. 1A through 1D, and correspondingly in FIGS. 2A through 2D, 3A through 3D, etc., would normally be provided on a single sheet, computer display, or the like, but are separated into four components in order to provide acceptable clarity for various information shown thereon.)

Figure 1A:
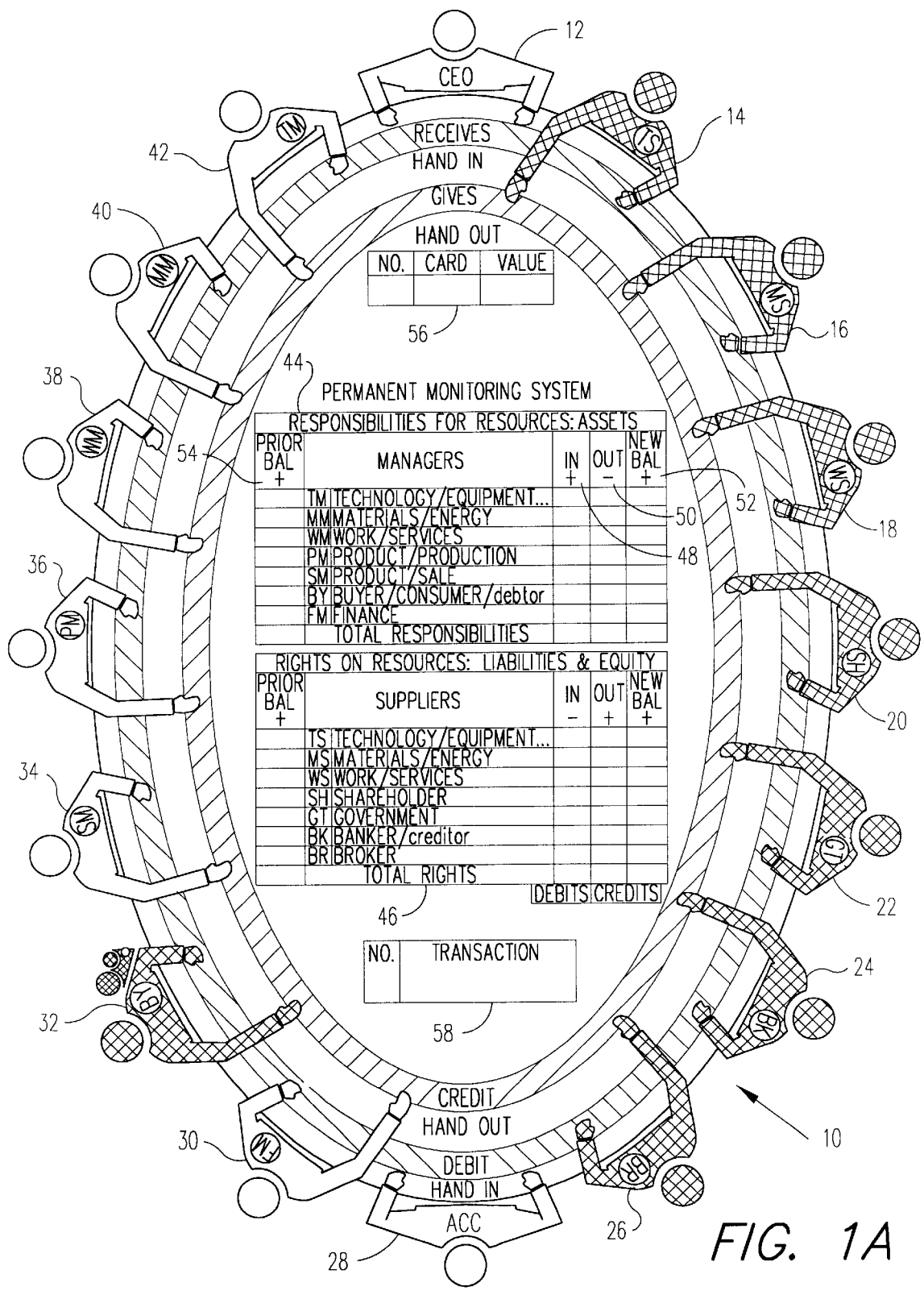
FIG. 1A is a view of the center portion of an exemplary transaction sheet used with the present economics teaching method.

FIG. 1A illustrates a symbolic, exemplary arrangement of participants in the present teaching method, situated about a "round table" or "corporate board" area 10. The symbolic participants shown about the board 10 may be considered as belonging to two different general groups or levels. Those shown generally to the right side of the board 10 in cross-hatch shading, comprise in a broad sense, suppliers of various goods and/or services, while those unshaded participant representations shown generally to the left side of the board 10, represent managers of various goods and services in a corporation.

The participant representations are described below, starting from the top of the board 10 and proceeding in a clockwise direction about the board 10. The participant representations comprise a Chief Executive Officer (CEO) 12; a Technology and Equipment Supplier (TS) 14; a Materials and Energy Supplier (MS) 16; a Work and Services Supplier (WS) 18, who represents the employees and outside suppliers; a Shareholder (SH) 20, who provides capital and entrepreneurial services; a Government Official (GT) 22, representing the supply of public services; a Banker (BK) 24, which represents the supply of financial services; a Broker (BR) 26, representing the supply of securities on the stock exchange; a Corporate Accountant (ACC) 28; a Finance Manager (FM) 30; a Buyer and Consumer (BY) 32, also comprising a Receivables Manager for the corporation, as indicated by the overlapping figure representations; a Sales Manager (SM) 34; a Production Manager (PM) 36; a Work and Services Manager (WM) 38, counterpart to the Work and Services Supplier 18 opposite; a Materials and Energy Manager (MM) 40, counterpart to the Materials and Energy Supplier 16 opposite; and a Technology and Equipment Manager (TM) 42, counterpart to the Technology and Equipment Supplier 14 opposite. While not all corporations include all of these staff or "stakeholders" specifically holding these titles, it will be seen that every economic enterprise essentially involves these functions, although (particularly in smaller businesses and enterprises) two or more of these functions may be held by a single individual.

In addition to the above stakeholders 12 through 42, additional stakeholders may participate in the present system or teaching method. For example, the Technology and Equipment Supplier and Manager (TS and TM) functions may be separated so that separate individuals are responsible for technology and for equipment. The Work and Services Supplier and Manager (WS and WM) functions may be separated in a like manner, as well. Also, additional functions of a Treasurer and Profitholder may be added in order to broaden the staff of stakeholder participants of the present teaching method, if so desired.

All business and economic transactions may be considered as a two part operation in that each involves giving, and being credited for giving, some good(s) and/or service(s), and corresponding receiving, and being debited for receiving, the good(s) and/or service(s). Hence, each of the stakeholder representations 12 through 42 of the board 10 (excepting the CEO 12 and Accountant 28, who fill managerial or administrative functions exclusively) is shown with one hand out, indicating the giving out of goods and/or services and being credited for such, and with the opposite hand in, indicating the receiving of some good(s) and/or service(s), and the corresponding debit which accompanies such a transaction.

The center area of the round table or corporate board area 10 includes a representation of a permanent monitoring system, which serves to indicate the specific stakeholders involved with any given transaction, and any credit and debit involved with the transaction. A first portion 44 of the monitoring system includes a listing of each of the managerial functions involved with the present teaching method, i.e., corresponding to the unshaded figures shown generally to the left side of the board 10. The second portion 46 of the monitoring system provides a list of each of the functions of the goods and services providers, corresponding to the shaded figures shown generally to the right side of the board 10. Three right hand columns 48 through 52 respectively show debits and credits applied to any of the fourteen stakeholder positions of the two portions 44 and 46 of the system chart, and the corresponding new balance in the right hand column 52. A previous balance column 54 is provided to the left side of the monitoring system shown in the center of the corporate board 10. An area 56 for entering the factors of a transaction card (the cards are discussed further below) is provided above the monitoring system 44 and 46, with another area 58 being provided below the monitoring system for indicating the transaction number and type.

FIG. 1B illustrates a transaction table 60, which may be provided on the same transaction sheet with the round table or corporate board 10 shown in FIG. 1A. (The transaction table 60 is divided into an upper and a lower section in FIG. 1B, for clarity in the drawing Figure.) The transaction table 60 includes a first column 62 indicating the transaction number, and a second column 64 briefly describing the transactions of the corresponding cards. The third (debit) and fourth (credit) columns, respectively 66 and 68, respectively indicate the debited and credited stakeholders of any given transaction described in the second column 64. In other words, all goods and/or services relating to any given transaction shown in the second column 64 will flow between the corresponding two stakeholders of the third and fourth columns 66 and 68. Finally, the fifth and sixth columns 70 and 72 respectively indicate the transaction card number and value of the card. (The value column 72 is blank, as the card values are arbitrary, and may be valued as desired.) The use of this table 60 is described further below.

Figure 1C:
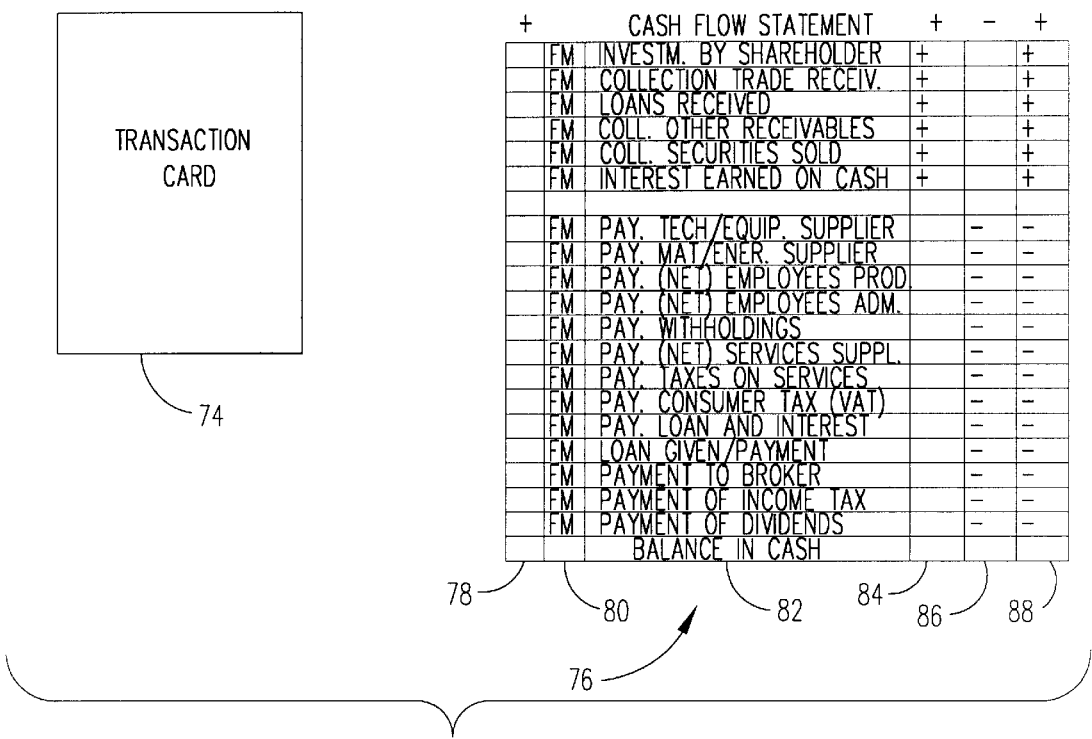
FIG. 1B is a view of the transaction table portion of the transaction sheet.
FIG. 1 is a view of the cash flow portion of the transaction sheet, and a location for the display of a transaction card.
FIG. 1D is a view of the balance sheet portion of the transaction sheet, including an area for notes as desired.

FIG. 1C illustrates additional components of an exemplary transaction sheet used with the present economics teaching method, providing an illustration of a transaction card position 74 and a cash flow statement 76. As each transaction card is drawn, it is turned face up on the transaction card area 74 and the information and instructions thereon are compared (visually or electronically) with the area 70 of the transaction table 60 to confirm that the card number is the same in both areas, i.e., that the stakeholders involved in the transaction are debited and credited properly for the identified good or service.

The cash flow statement 76 includes a first entry column 78, a second column 80 indicating the stakeholder involved, a third column 82 containing a series of brief descriptions of the transactions involved, a fourth or debit column 84, a fifth or credit column 86, and a sixth or balance column 88. The cash flow statement 76 is thus structured imaginatively as a global monetary account of a corporation, with the transactions described and entered therein being restricted only to monetary income and outgo between the corporation and outside entities, with all of the limited transactions indicated, passing through the finance manager (FM), as indicated in the second column 80 of the statement 76. In contrast, the transaction table or statement of FIG. 1B provides considerably more detail, and includes internal transactions which are an important part of understanding the complete economic picture of any business or other enterprise.

FIG. 1D completes the components of an exemplary transaction sheet of the present economic teaching method. FIG. 1D provides an unconventional format of a balance sheet, structured as a permanent global account of a corporation, rather than as a derivative of a series of ledger accounts. The balance sheet includes an assets portion 90, a liabilities and equity portion 92, and corresponding income statement 94. Each of these portions 90 through 94 includes a first column 96 for entering the previous balance amount, a second column 98 for indicating the stakeholder involved, a third column 100 generally indicating the titles of conventional ledger accounts, and fourth through sixth columns, respectively 102 through 106, for entering debits, credits, and new balances as appropriate. FIG. 1D also includes an area 108 for any notes which a participant may wish to make regarding a given transaction.

It will be seen that the balance sheet of FIG. 1D contains more information than a conventional format, since it discloses (from left to right): The beginning balance of an account, the stakeholder associated with the account, the title of the account, the flow of values (debits and credits), and the ending balance of each balance sheet or ledger account. In a like manner, the cash flow statement 76 of FIG. 1C tells the complete story of the cash transactions involved in corporate economics.

It should also be noted that the balance sheet of FIG. 1D contains a novel form of profit or income statement, which completes the information contained in its master account. In effect, the profit (income) statement 94 presents a pre-structured set of corporate operational expenses, comprising amortization (a); depreciation (d); materials (m); energy (e); work (w); and services (s). For corporate management, these may be a sort of competitive milestone which must be kept under permanent control.

FIGS. 2A through 7D illustrate exemplary portions of a series of transaction sheets, showing the behavior of the present teaching system in handling a series of five transactions of the numerous exemplary transactions contained on the transaction tables 60 of the drawing Figures. A series of five exemplary transaction cards, respectively 110 through 118, is shown in FIG. 8 of the drawings, with these cards being used in the transaction examples of FIGS. 2A through 7D. Each of the cards 110 through 118 includes a card number 120, in large characters in the center of the card. The card numbers 120 correspond to the numbers of the fifth column 70 of the transaction table 60, shown in FIG. 1B of the drawings. Each card also includes indicators 122 and symbols 124 of the general type of transaction, as well. The cards 110 through 118 may be color coded as a mnemonic means of enabling participants to more readily recognize the general subject area of each card, as indicated by the color symbol cross-hatching shown on each of the cards of FIG. 8. For example, the monetary cards 110 may be colored green (for "greenbacks"); production cards 112, yellow (representing "gold"); administration cards (e.g., the technology administration card 114) may be colored red (for "red tape"); investment cards (e.g., the securities purchased card 116) may be colored blue (as in "blue chips"); and a non-economic card, such as the document-dividends card 118, may remain uncolored.

These cards 110 through 118 may be arranged in their own numerical order (i.e., by card number), by order of transaction according to the first column 62 of the transaction table 60, or randomized in some other order as desired. It will be noted that no specific values are provided on the cards, as such values are arbitrary for the purposes of the present teaching method. Also, other factors, such as the participants or entities (stakeholders) involved in the transaction and the specific type of transaction to which each card relates, are shown only to the extent such information contributes to better relate each card to the real good or service it symbolizes. More information pertinent to these factors is provided in the appropriate rows of the transaction table 60 of the drawing Figures.

To begin an economics teaching session according to the present method, a group of participants representing stakeholders of a virtual economic enterprise (corporation, etc.) is selected. Preferably, the participants are placed in their respective stakeholder positions (e.g., sales manager, finance manager, shareholder, etc.) in accordance with their actual corporate positions in their working careers, in order for these participants to grasp the distinctions between the present method and conventional methods involving balance sheets, profit and loss statements, etc. However, it will be seen that other parties may participate in the present economics teaching method, as desired. Also, while a table or board 10 is shown schematically in FIG. 1A and other Figures of the present disclosure, it will be seen that the participants need not actually be seated or positioned about such a board. In fact, they need not even be present in the same room or location with one another, if a computerized or electronic teaching session is arranged, with participants participating by means of a computer network or other suitable communications means.

Figure 2A:
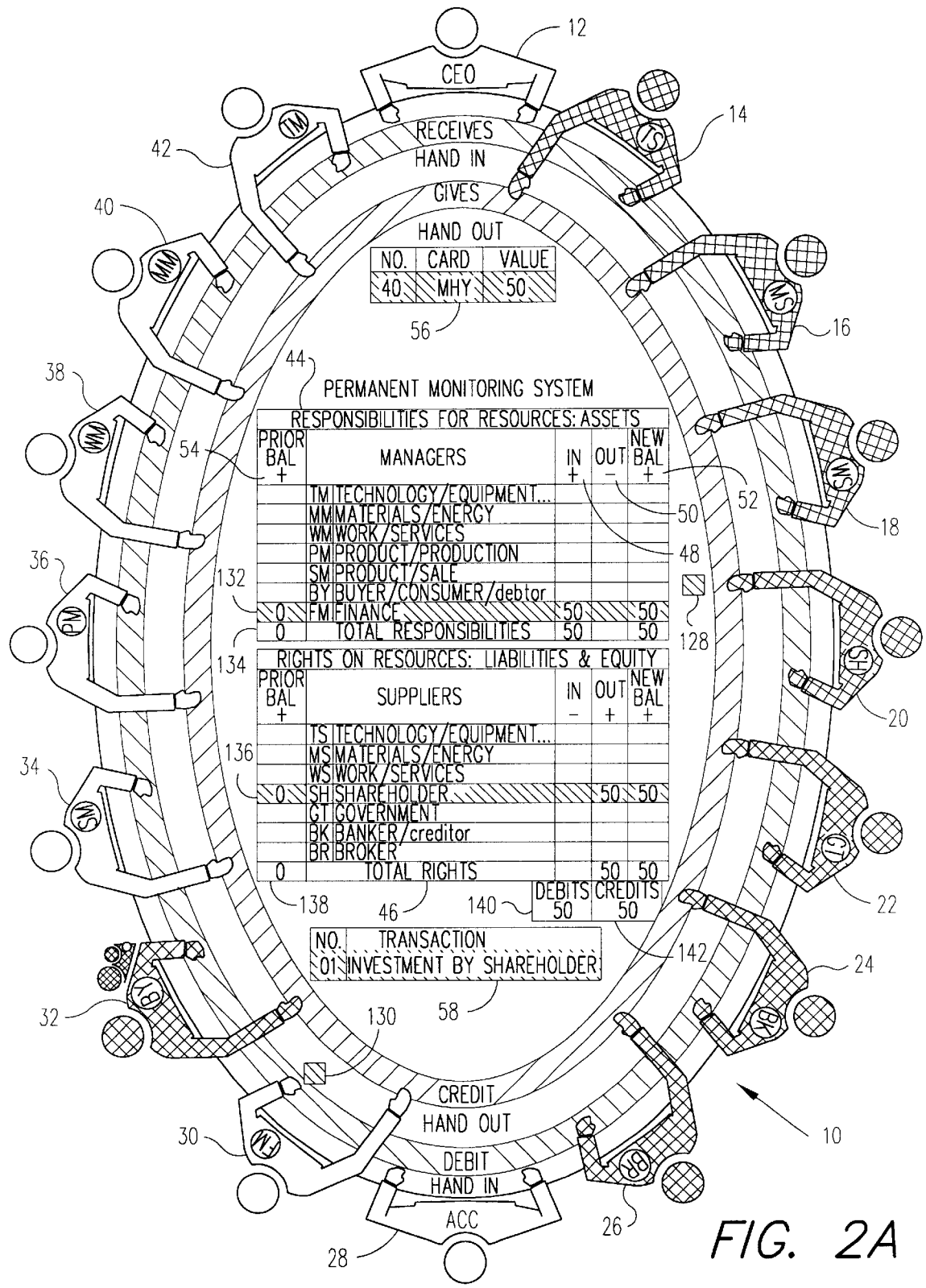
FIG. 2A is a view of the center portion of a transaction sheet, showing the transaction indicated by a corresponding transaction card.
Figure 2C:
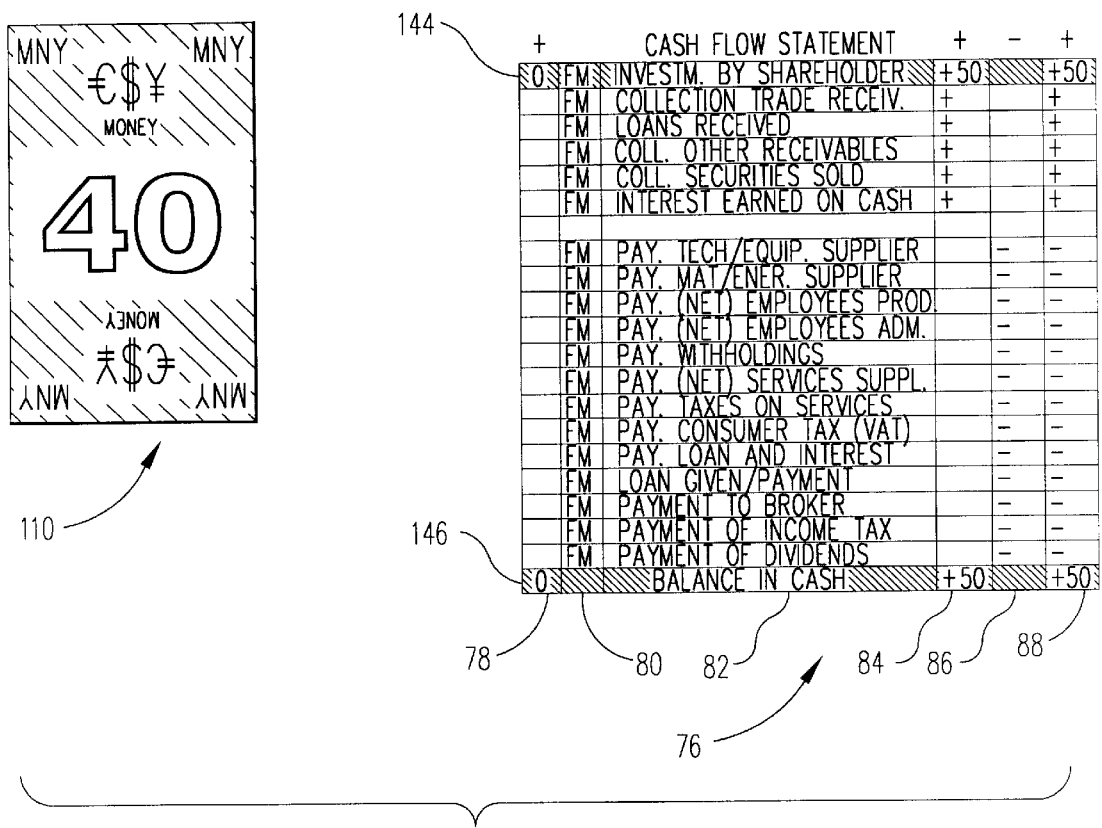
FIG. 2C is a view of the cash flow and balance sheet portions of the transaction sheet partially shown in FIGS. 2A and 2B, showing the entries in accordance with the exemplary transaction card displayed.

A transaction card, e.g., the first transaction card 110 of FIG. 8, is selected and placed in the appropriate area of the transaction sheet, as shown in FIG. 2C of the drawings. The card number and type ("MNY," or money) and arbitrary value (e.g., 50) are then entered in the card entry area 56 of the corporate board 10, as in FIG. 2A of the drawings. This area may also be color coded to correspond with the card color, for ready identification of the transaction subject.

Reference is then made to the transaction table 60 to determine the specific transaction to be made. In this case, the first transaction card is card number 40, which corresponds to the first transaction row 126 shown in the first column 62 of the transaction table 60. This transaction is titled "Investment By Shareholder," and the transaction number (1) and title of transaction according to the appropriate row of the transaction table 60, are entered in the transaction indication area 58 of the corporate board or round table 10, as shown in the table or board 10 of FIG. 2A. The transaction amount entered in the card entry area 56, is also entered in the appropriate row (e.g., the top row 126, or row 1) of the transaction table 60, as shown in FIG. 2B. This row 126 corresponding to the first transaction card 110 may be shaded or colored (e.g., green) to correspond with the color of the card, if so desired.

The first row 126 of the transaction table 60 describes the transaction as "Investment By Shareholder" in the second column 64, with the third and fourth columns 66 and 68 indicating that this transaction passes from the hand of the shareholder SH, who is credited, to the hand of the finance manager FM, who is debited (or more accurately, has accepted a debt on behalf of the corporate or economic entity with which he is associated). The debit and credit are equal, with the value being entered in the first row 126 of the last column 72 of the transaction table 60.

This transaction is also reflected on the corporate board or round table 10, as shown in FIG. 2A of the drawings. It will be noted that an appropriately shaded or colored credit marker 128 is positioned adjacent the right or "giving" hand of the shareholder 20 in FIG. 2A, indicating that the shareholder 20 has given some predetermined amount (e.g., fifty dollars, or other arbitrary amount) to the company represented by its finance manager 30, who received the monetary amount. The corresponding debit marker 130 is located adjacent the left or "receiving" hand of the finance manager 30, indicating that the finance manager 30 has received the capital by the corresponding share certificates. Accordingly, the company is indebted to the shareholder 20 in an amount corresponding to that invested by the shareholder.

The corresponding entries may also be made in the first and second portions 44 and 46 of the monitoring system in the center of the board 10 of FIG. 2A, where they are entered on the "Finance (Manager)" line 132 of the first portion 44, and on the "Shareholder" line 136 of the second portion 46 of the monitoring system. These two entries are also instantaneously totalized on the "Total Responsibilities" line 134 (for assets) of the first portion 44 and on the "Total Rights" line 138 (for resources) of the second portion 46 of the monitoring system. The amounts are also totalized in the debits and credits areas 140 and 142 of the board 10. It will be seen that in each instance, the rights or credits of the shareholder, are exactly balanced by the management responsibilities, and that this balance is clearly shown in the respective monitoring system portions 44 and 46 of FIG. 2A.

This transaction is also entered on line 126 of the transaction table 60 of FIG. 2B, as well as into the cash flow statement 76 of FIG. 2C, on the first line 144 (Investment by Shareholder) and on its bottom line 146 (Balance in Cash). As in the other entries of the present method, the appropriate lines 144 and 146 may be color coded (e.g., green, in this case) in order to show the entries more clearly. It will be seen that the cash flow statement 76 reflects only the corporate or enterprise side of the economic picture, without showing the corresponding debt of the enterprise to the shareholder, as shown in the monitoring system portions 44 and 46 of FIG. 2A and also in the transaction table 60 of FIG. 2B.

Finally, the transaction is entered in the balance sheet portions 90 through 94 of FIG. 2D, with the amount received being shown as an asset in the first line 148 and Total Assets line 150 of the first portion 90 of the balance sheet, and on the Shareholder's Investment line 152 and Total Liability/Equity line 154 of the second portion 92 of the balance sheet. While the conventional balance sheet format does show different types of assets and the corresponding total assets, as well as different types of liabilities and equity accounts and the corresponding liabilities and equity, it is not supported by an integrated system that reveals itself, visually and electronically, through a series of interconnected documents or statements such as the transaction table and cards, monitoring system, cash flow statement, balance sheet, and profit statement of the present system. All of these mechanisms are integrated, conceptually and instrumentally, in the present teaching system making it far more effective both in accelerative education and in management training programs than any other traditional or other new method in the combined fields of business economics, management, and accounting.

Figure 3A:
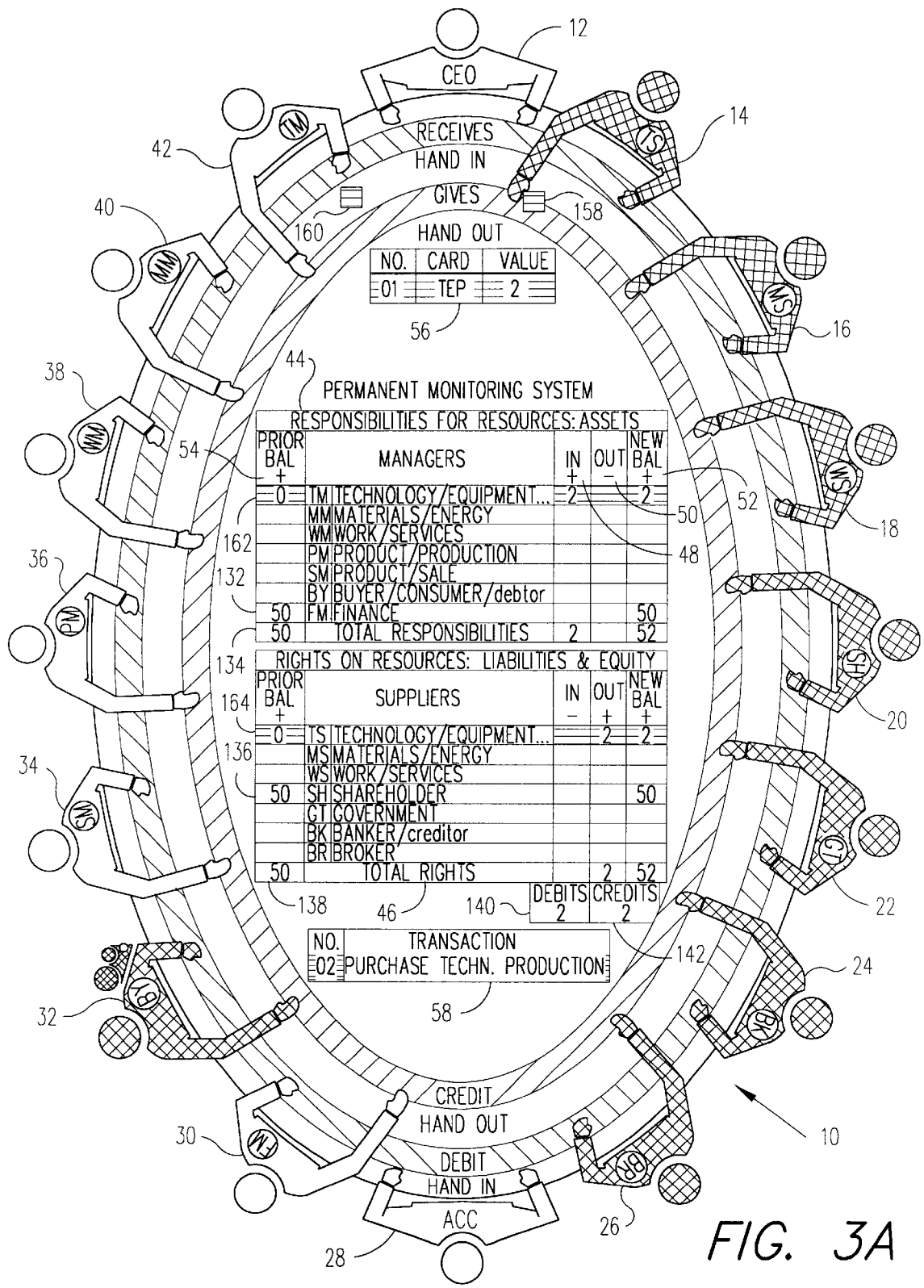
Figure 3C:
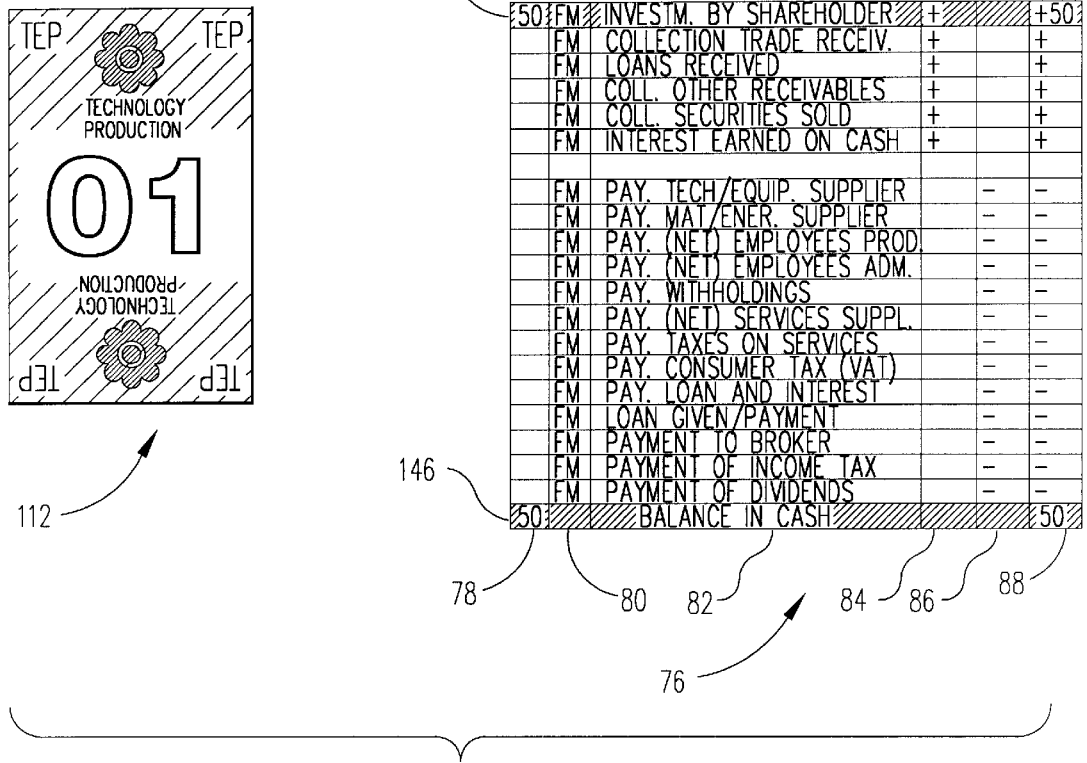

FIGS. 3A through 3D illustrate a further example, using the second transaction card 112 of FIG. 8. The second transaction card 112 relates to technology for production, as indicated by its title and symbols. This is card number one on the transaction table 60, and corresponds to the second transaction of the transaction table 60, i.e., the "Purchase Technol. Production" line 156. The debit and credit columns 66 and 68 of the transaction table 60 indicate that the transaction passes a good or service (here symbolized by the card 01, TEP, or Technology for Production) from the Technology and Equipment Supplier (TS, or participant 14 of FIG. 3A) to the Technology and Equipment Manager (TM, or participant 42 of FIG. 3A). This is indicated in FIG. 3A by the appropriate credit marker 158 adjacent the right hand of the TS participant 14, and a corresponding debit marker 160 adjacent the left hand of the TM participant 42 in FIG. 3A. The card characteristics are also entered in the card entry area 56 and transaction indicator area 58 of table or board 10 of FIG. 3A.

Corresponding entries are made in the various tables and sheets in the manner described above for the transaction shown in FIGS. 2A through 2D. FIG. 3A illustrates the entries in the two portions 44 and 46 of the monitoring system corresponding to the respective lines 162 (responsibility for assets of the Technology and Equipment Manager) and 164 (right of claim, i.e., liability, of the company to the Technology and Equipment Supplier). The management responsibilities are totalized on line 134 and the supplier rights of claim are totalized on line 138 of the respective monitoring system portions 44 and 46 of FIG. 3A. Thus, the upper portion 44 of the monitoring system indicates the same total of management responsibilities as does the lower portion 46, which indicates the corresponding rights of claim or liabilities and equity. It should also be noted that the permanent monitoring system controls its own entries by totalizing debits and credits of each transaction, as indicated by lines 140 and 142 of the permanent monitoring system of FIG. 3A.

Simultaneously, corresponding entries are made in the first and second balance sheet portions 90 and 92 of FIG. 3D, respectively in the "Technol. Production" and "Tech./Equip. Payables" lines 166 and 168 therein. While these two portions 90 and 92 of the balance sheet indicate a balance, the conventional balance sheet format does not provide any networked information (balance sheet, monitoring system, transaction cards and table, etc.), which eliminate most if not all duplicated entries and unnecessary administrative and accounting work. It will also be noted that no entries are made for this transaction in the cash flow statement of FIG. 3C, as it was the "Technology for Production" transaction card (no. 01—TEP) and not the "Money" card (no. 40—MNY) which was exchanged in this transaction (02—Purchase Technology Production). As in the entries of FIGS. 2A through 2D, the various entry lines used for the transaction described in FIGS. 3A through 3D may be color coded to match the color of the Technology for Production card 112 (e.g., yellow) in order to allow the various entries to stand out more clearly.

FIGS. 4A through 4D illustrate yet another transaction, involving the third card 114 (Technology Administration) of FIG. 8. Again, the number of the card (seven, in this case) is located in the appropriate column 70 of the transaction sheet 60, as indicated by the correspondingly shaded or colored "Purchase Technology Administration" line 170 of the transaction sheet 60 of FIG. 4B. The corresponding transaction is entered into the monitoring system portions 44 and 46, respectively on the Technology/Equipment lines 162 and 164 of the two portions 44 and 46, as in the previously described transaction of FIG. 3A. The transaction is also entered in the card entry and transaction indicator areas 56 and 58 of FIG. 4A, as in other transactions described further above.

Figure 4A:
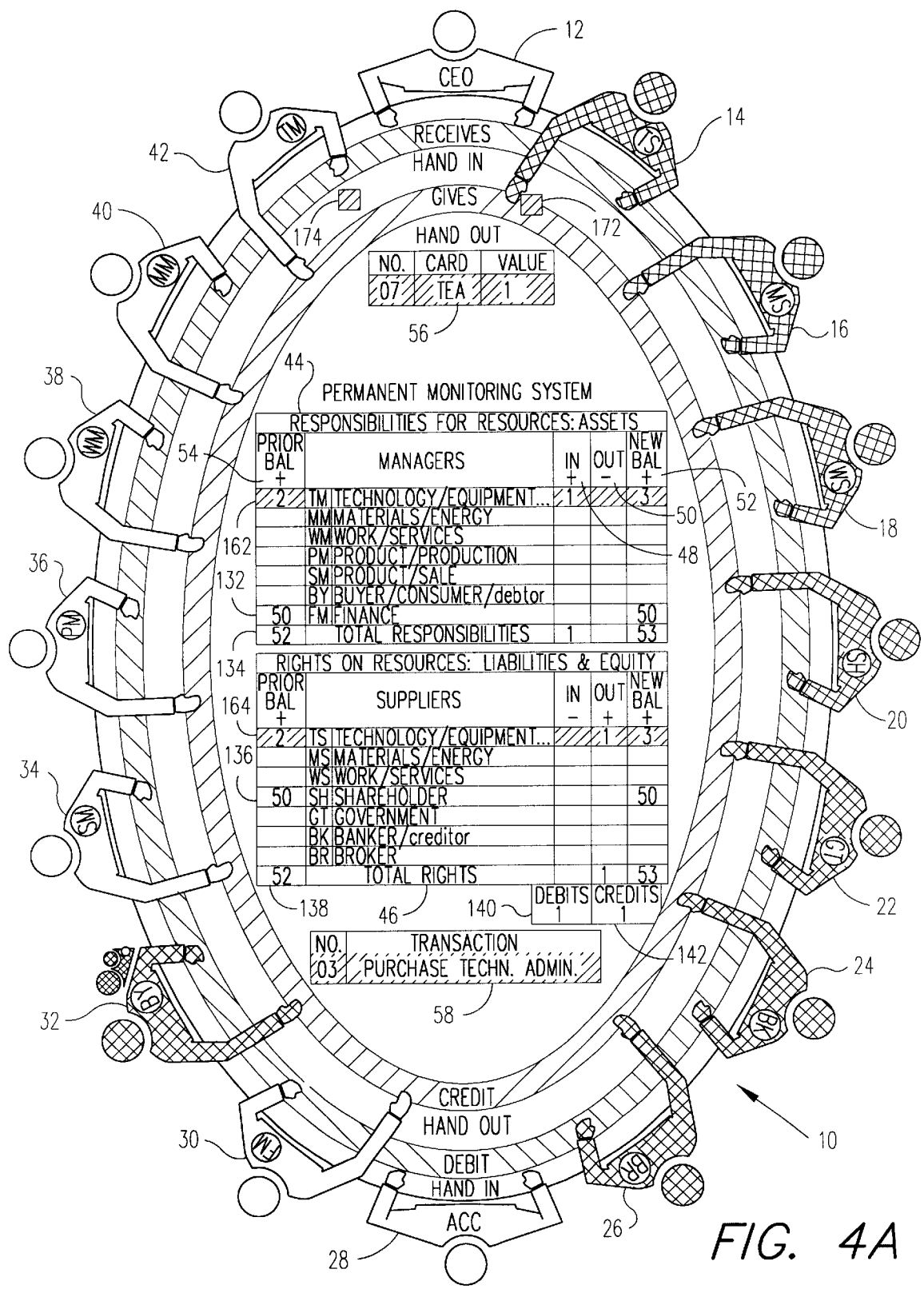
Figure 4C:
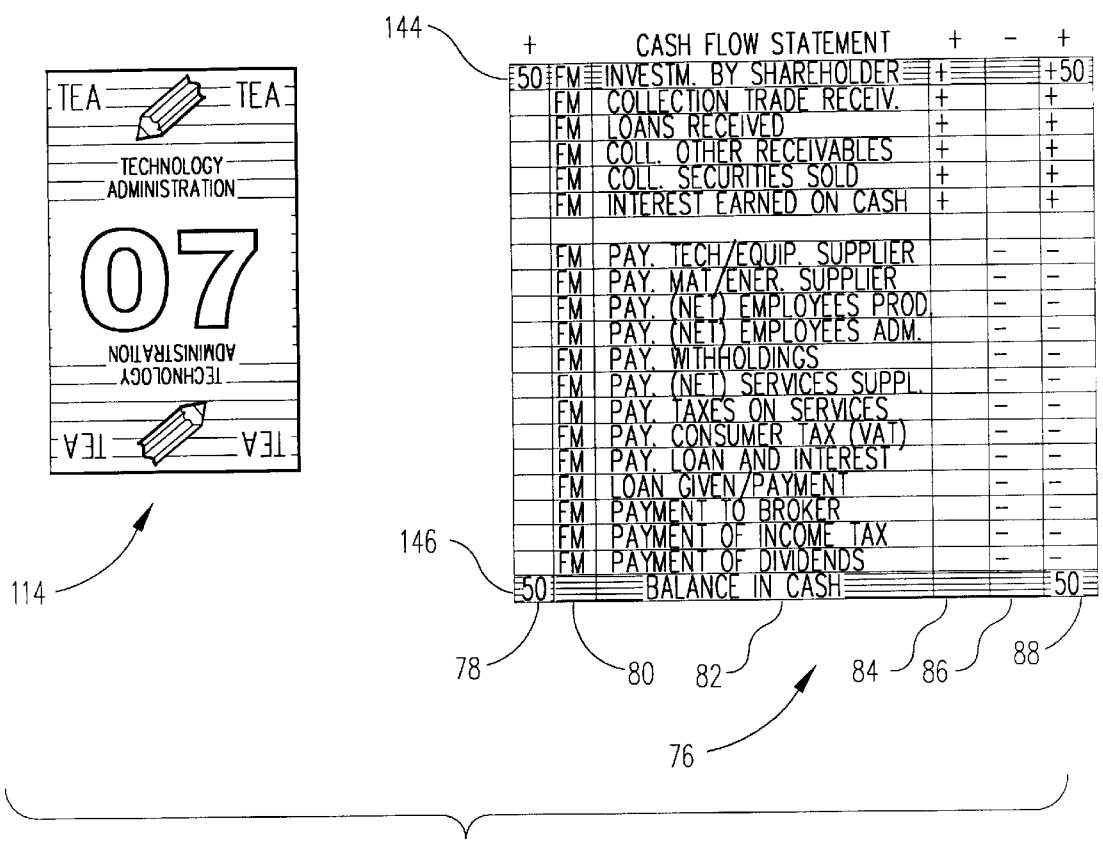

It will be seen from the columns 66 and 68 of FIG. 4B, that the transaction takes place between the Technology Supplier 14 (the creditor, in this transaction) and the Technology Manager 42 (the debtor, in this transaction), in a manner similar to that described in the transaction of FIGS. 3A through 3D discussed further above. As a technology transaction between an outside supplier and the economic enterprise occurs here, the same participants 14 and 42 as were involved in the transaction of FIGS. 3A through 3D are involved here, even though the transaction involves an administrative rather than a production process of the enterprise. Accordingly, the same lines 162 and 164 of the permanent monitoring system portions 44 and 46, are used in FIG. 4A.

It will be noted, however, that the color coding used for the entries of FIGS. 4A through 4D is different from that used in FIGS. 3A through 3D, as the type of transaction (administration v. production) is different. This is also indicated by the credit and debit markers 172 and 174, respectively positioned at the extended right hand of the Technology and Equipment Supplier TS 14 and the left hand of the Technology and Equipment Manager TM 42 of FIG. 4A. These markers 172 and 174 are colored differently than the markers 158 and 160 of FIG. 3A, as they indicate an administrative transaction, rather than an production transaction, as in FIG. 3A.

Entries are also made in the first two portions 90 and 92 of the balance sheet of FIG. 4D, similarly to the entries made for the transaction of FIGS. 3A through 3D. However, the entry in the Assets portion 90 of the balance sheet is placed on the Technology for Administration line 176 of the Assets portion 90 of the balance sheet, as the balance sheet includes such a provision. Again, no entry is made in the cash flow statement 76 of FIG. 4C for this transaction.

In FIGS. 5A through 5D, the fourth card 116 of FIG. 8 ("Securities Purchased") is used to define the basic transaction. As in the other transactions described above, the number of the card (42) is referenced on the transaction table 60, with this card corresponding to transaction no. 57 ("Purchase of Securities"), with the appropriate line of the transaction table being indicated by the reference numeral 178. The corresponding entries are made in the card entry and transaction indication areas 56 and 58 of FIG. 5A. The appropriate participants are indicated by the debit and credit columns 66 and 68 of the transaction table 60, i.e., the debit participant being the Finance Manager (FM) 30 position, and the credit participant being the Broker (BR) position 26. These participants in the transaction are indicated graphically by a credit marker 180 adjacent the extended right hand of the Broker BR position 26, with a corresponding debit marker 182 adjacent the left hand of the Finance Manager FM position 30, to indicate the path of a transaction involving the purchase of securities from the Broker 26.

Figure 5A:
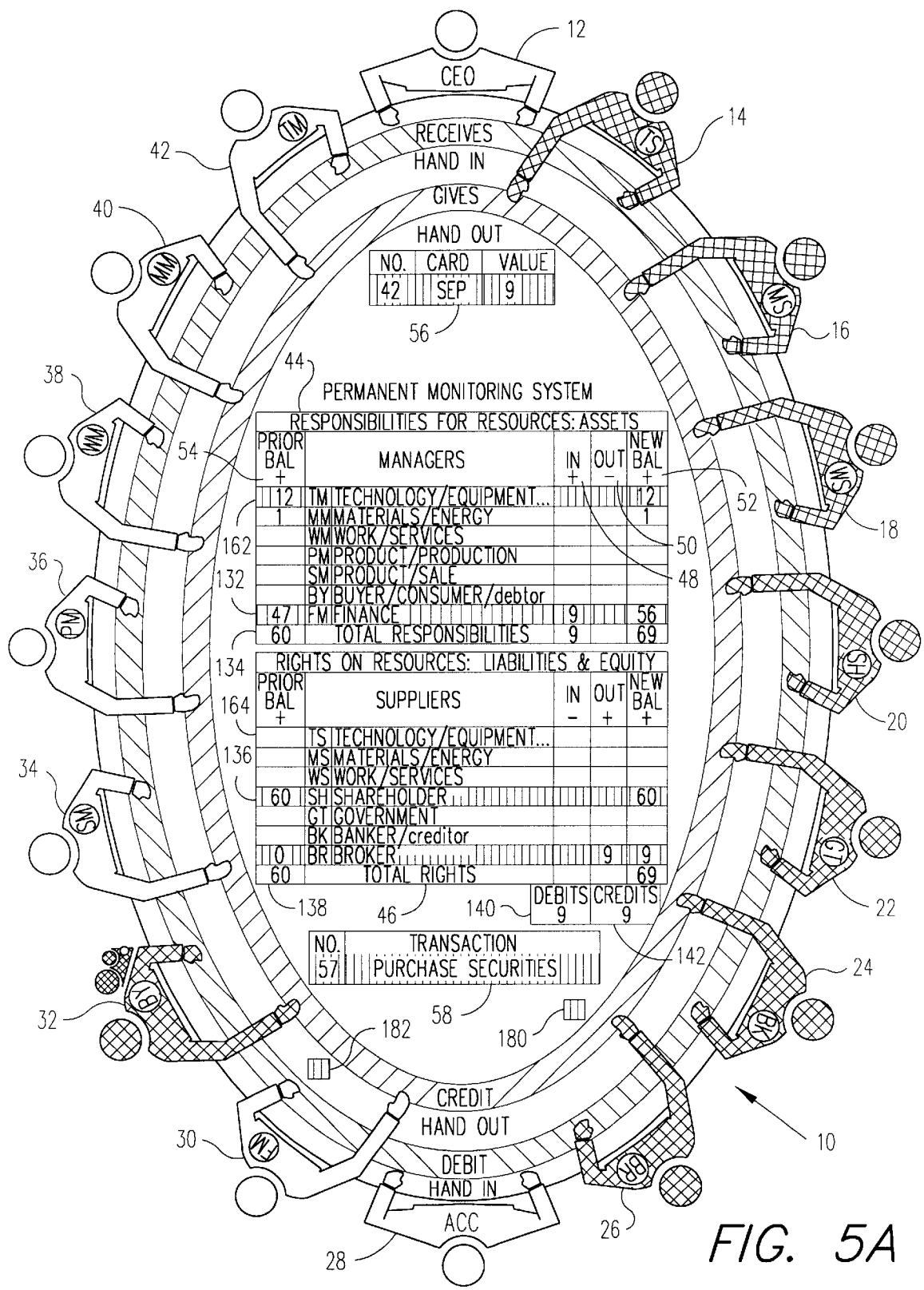
Figure 5C:
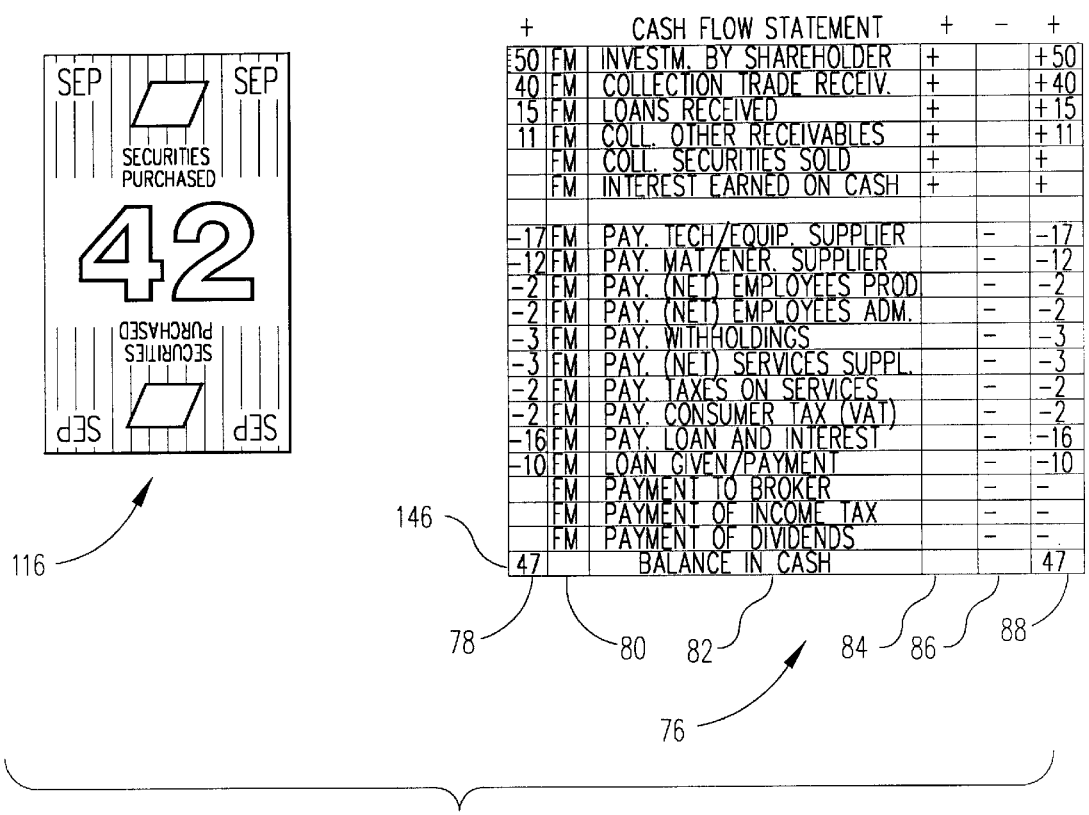

Corresponding entries are shown on the Assets and Liabilities & Equity balance sheet portions 90 and 92 of FIG. 5D, respectively on the "Securities" and "Broker Payable" lines designated by the reference characters 184 and 186. The total assets and total liability or equity are equal, in accordance with conventional balance sheet practice, with this transaction additionally being shown in the monitoring system portions 44 and 46 of FIG. 5A. It should also be noted that the cash flow statement 76 of FIG. 5C has been filled in to indicate prior transactions to this point. This transaction of "Purchase of Securities" does not involve the "Money" card 110 (no. 40, MNY), but rather involves the "Securities Purchased" card 116 (no. 42, SEC).

Figure 6A:
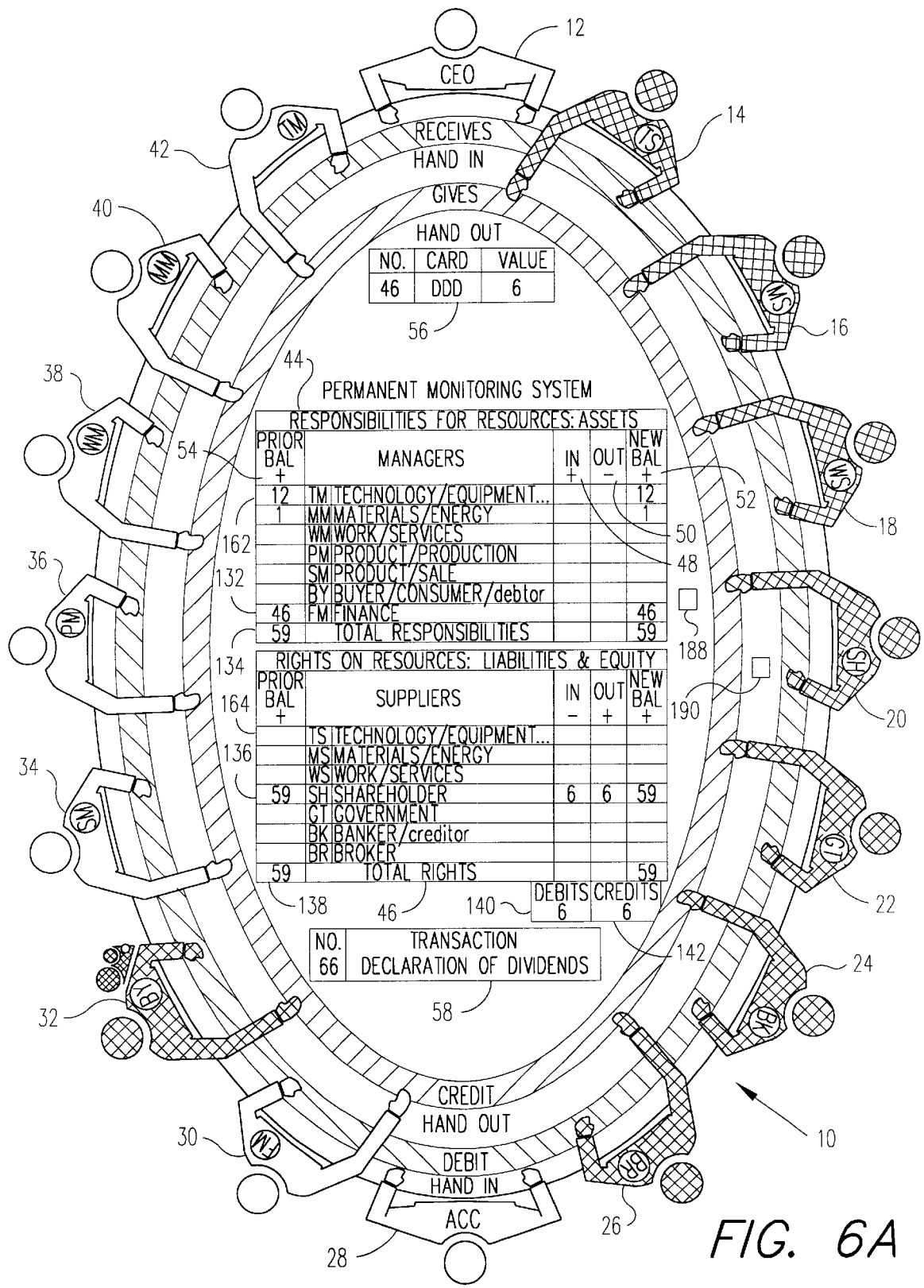
FIGS. 6 through 6D illustrate portions of a further transaction sheet, showing the appropriate entries corresponding to a further type of transaction card as shown in FIG. 6C.
Figure 6C:
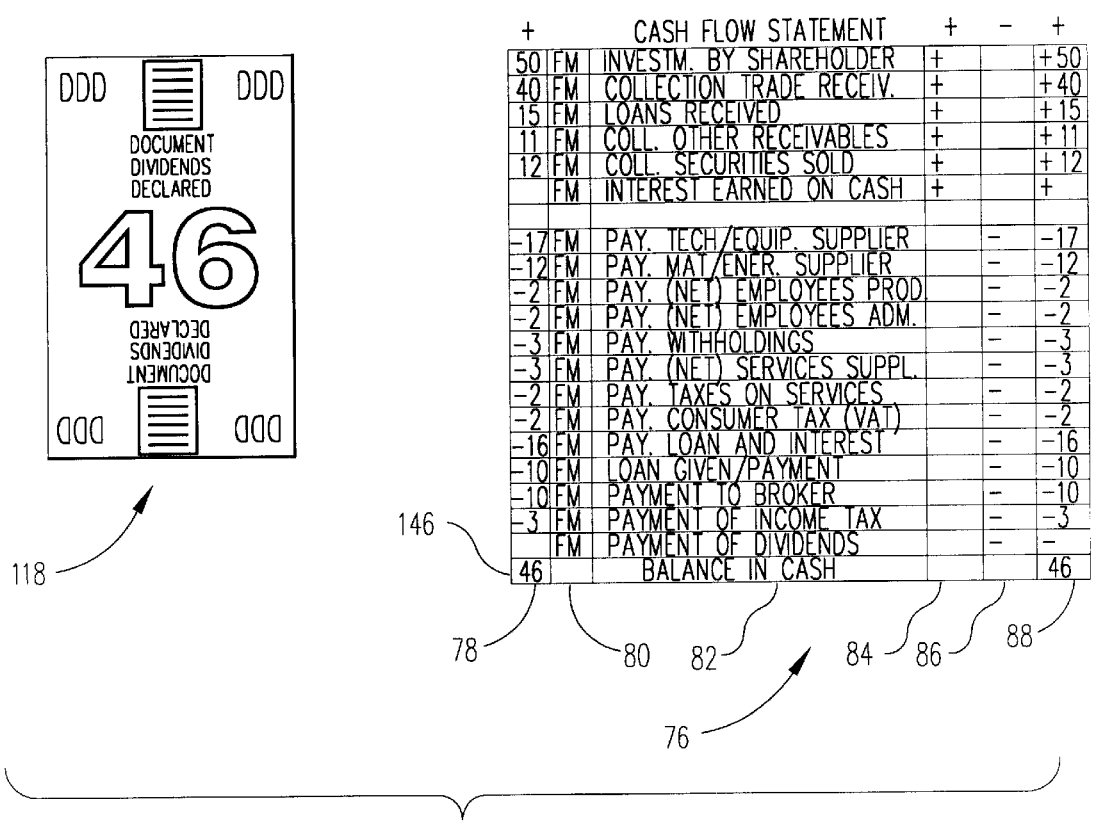

FIGS. 6A through 6D illustrate a further transaction involving the declaration of dividends by the exemplary corporation or enterprise of the present economics teaching method. The fifth transaction card 118 of FIG. 8 is used for this transaction, and as in the other transactions described further above, the card 118 is placed upon the transaction card area of the transaction sheet, as indicated in FIG. 6C. This card is card number 46 ("Document Dividends Declared," or DDD) according to the card numbering used in the present disclosure, which will be seen to correspond to transaction no. 66 in the transaction table 60. The debit and credit columns 66 and 68 show that as the declaration of dividends is a matter concerning only one of the stakeholders, i.e., the shareholder SH 20 of FIG. 6A, that shareholder 20 serves as both the receiving and giving party in this transaction.

Accordingly, the credit marker 188 is positioned adjacent the extended right hand of the shareholder SH 20, with the corresponding debit marker 190 being positioned adjacent the left hand of the shareholder SH, as shown in FIG. 6A. (No shading has been provided for the card 118, so the corresponding entry lines of the associated forms or sheets and credit and debit markers are not shaded, as they were in previous examples.) The instructions of the card 118 are also entered in the appropriate card entry and transaction indicator areas 56 and 58 of the table or board 10 of FIG. 6A.

The dividend amount (again, all such amounts are arbitrary) is entered into the "Declaring Dividends" line 192 of the transaction table 60 of FIG. 6B, with a corresponding entry being made in the "Profit Retained" line 194 of the second portion 92 of the balance sheet of FIG. 5D. The dividend declaration is not entered in the cash flow statement, as it is not a cash transaction and did not involve the money card 110 (card 40, MNY). In more general terms, the dividend declaration only changes the nature of the shareholder's rights over the net assets of the corporation.

It will be seen that a great number of such economic transactions may be performed, with the above described transactions serving as examples of such between various managers, suppliers, buyers, and other stakeholders involved in the corporation or economic entity. The transaction table 60 provides a comprehensive list of possible transactions in accordance with the present method of teaching economics, management and accounting, but it will be seen that the listing of the transaction table 60 is by no means exhaustive.

Figure 7A:
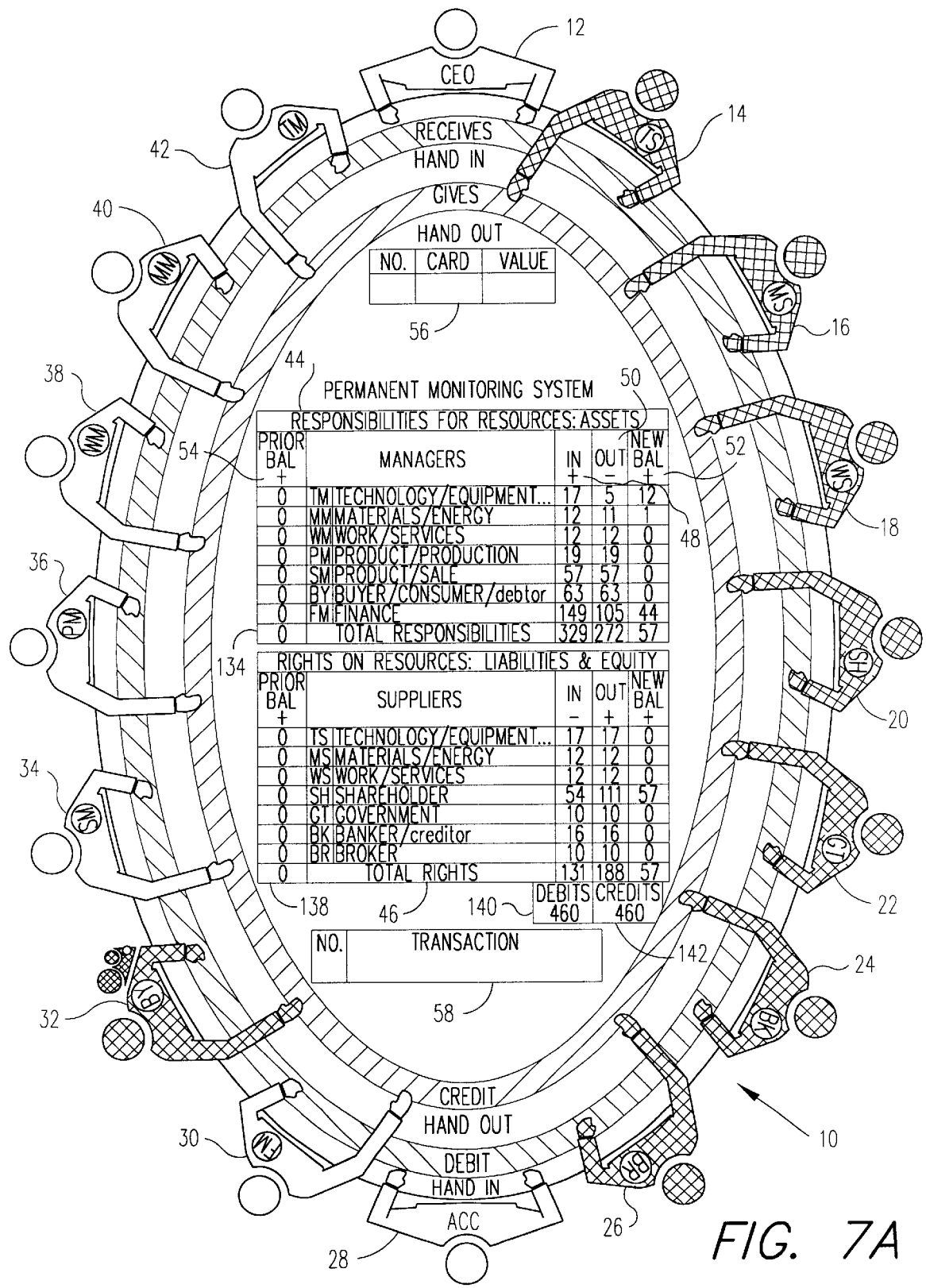
Figure 7C:
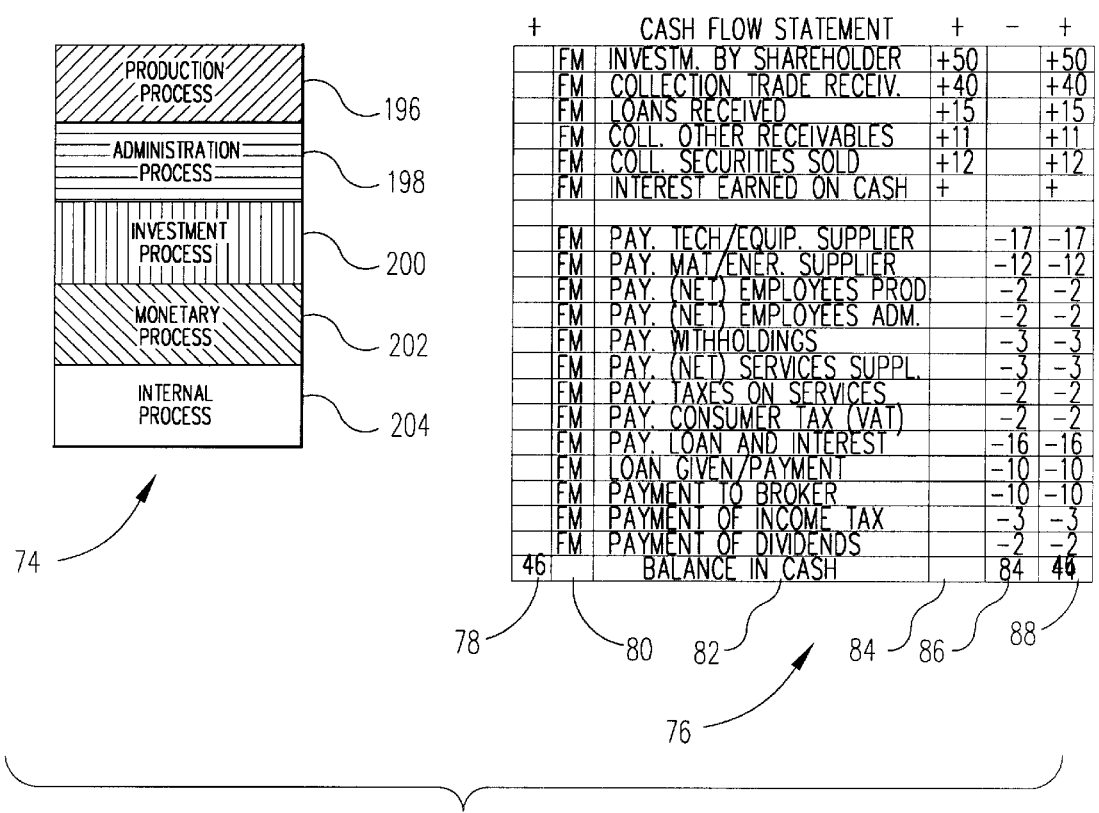
Figure 8:
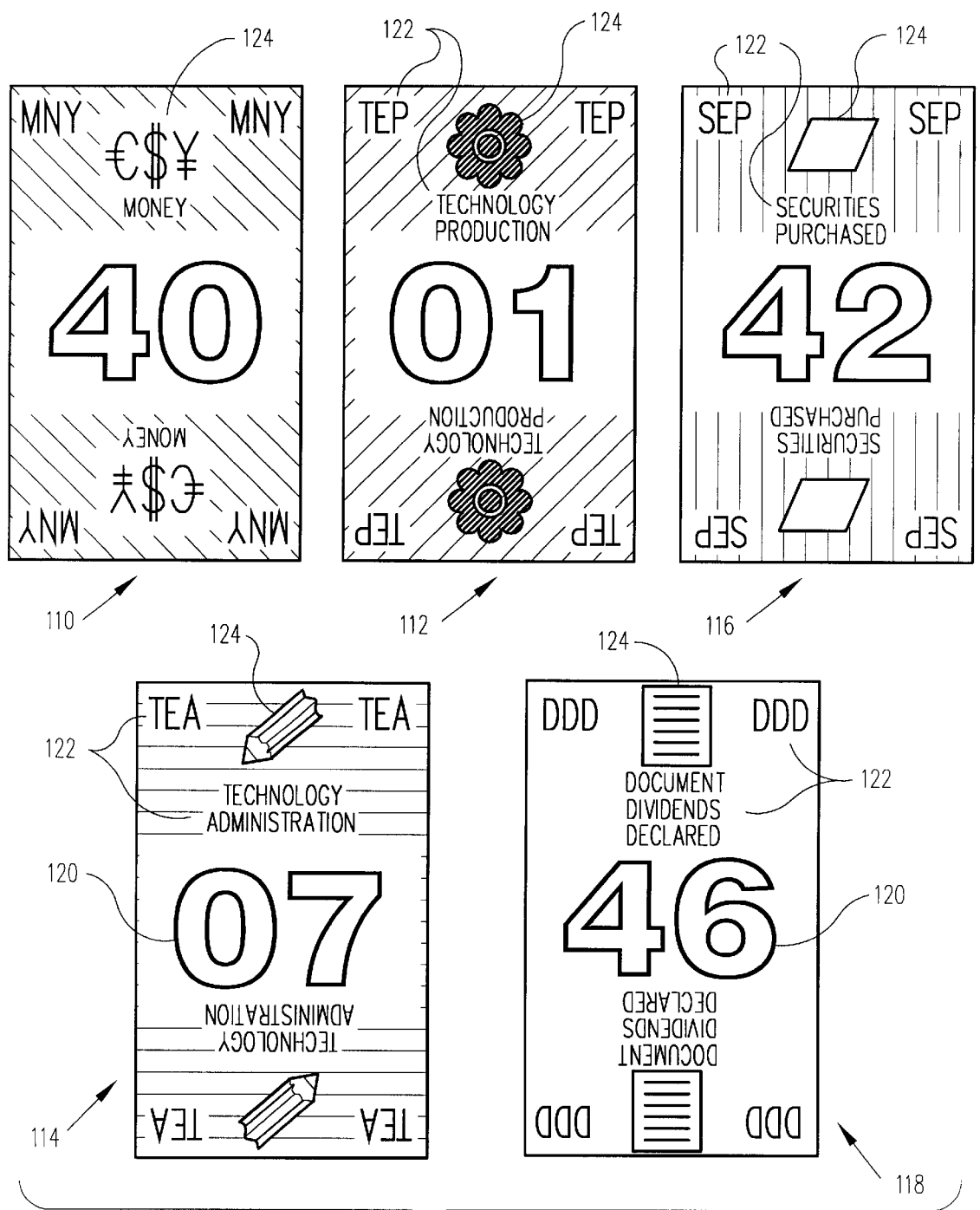
FIG. 8 is a view of the faces of a series of exemplary transaction cards used in the present economics teaching method.

FIGS. 7A through 7B provide illustrations of the various portions of a completed transaction sheet, after all of the transaction cards corresponding to the entries of the table 60 have been drawn and the corresponding transactions recorded as appropriate in the various forms and sheets of the transaction sheet. It will be seen in FIG. 7A that the total responsibilities for resources (assets) of the bottom line 134 of the upper or responsibilities portion 44 of the monitoring system, balances precisely with the total rights (liabilities or equity) of the bottom line 138 of the second portion 46 of the monitoring system. In a like manner, the total debits of the area 140 and total credits of the area 142, also balance perfectly, using the present teaching method.

It will be noted that each of the lines or rows of the transaction form or table 60 of FIG. 7B, is colored or shaded to correspond with the color or shade of the corresponding transaction card type for that particular line (excepting three blank lines). Also, lines 66 and 67, the "Declaring of Dividends" and "Dividends Paid In Shares" lines, which correspond to an unshaded card, i.e., card 118 of FIG. 8, remain blank, as these transactions are of an internal or documentary nature rather than involving interactions among different parties. Accordingly, the transaction card position 74 of the transaction sheet or board, may include a series of corresponding colors or shades in order to reinforce the concept of color coding for different types of goods or services and transactions. For example, production process cards (e.g., the "Technology for Production" card 112 exemplified in FIG. 8) and corresponding operational lines of the transaction sheet 60 may be colored or shaded yellow, as indicated by the shaded transaction process area 196 of the card placement area 74 of FIG. 7C. Administration processes, as indicated by the "Technology for Administration" card 114 and second area 198 of the card placement area 74, and corresponding lines of the various forms corresponding to such administrative processes, may be colored or shaded red (as in the aphorism, "red tape"). Investment processes, indicated by the third area 200 of the card placement area 74 and exemplified by the "Securities Purchased" card 116 of FIG. 8 and corresponding lines, may be colored or shaded blue (as in "blue chip investments"). Green is an exemplary color for monetary processes (as in the expression "greenback"), with the monetary process area 202 of the card placement area 74, along with the various monetary process cards (e.g., the "Money" card 110 of FIG. 8) and associated entry lines of the forms being colored or shaded green. Finally, purely internal processes as exemplified by the "Document Dividends Declared" card 118 of FIG. 8, are indicated by the unshaded area 204 of the card placement area 74 shown in FIG. 7C. It will be seen that the above described colors or shades are exemplary, and that other colors, shades, or markings, or no such colors shades, or markings at all, may be used as desired as mnemonic devices for assisting participants in recognizing the generally subject area or process related to each of the cards (i.e., symbolized goods and services) and its associated operation.

Figure 9A:
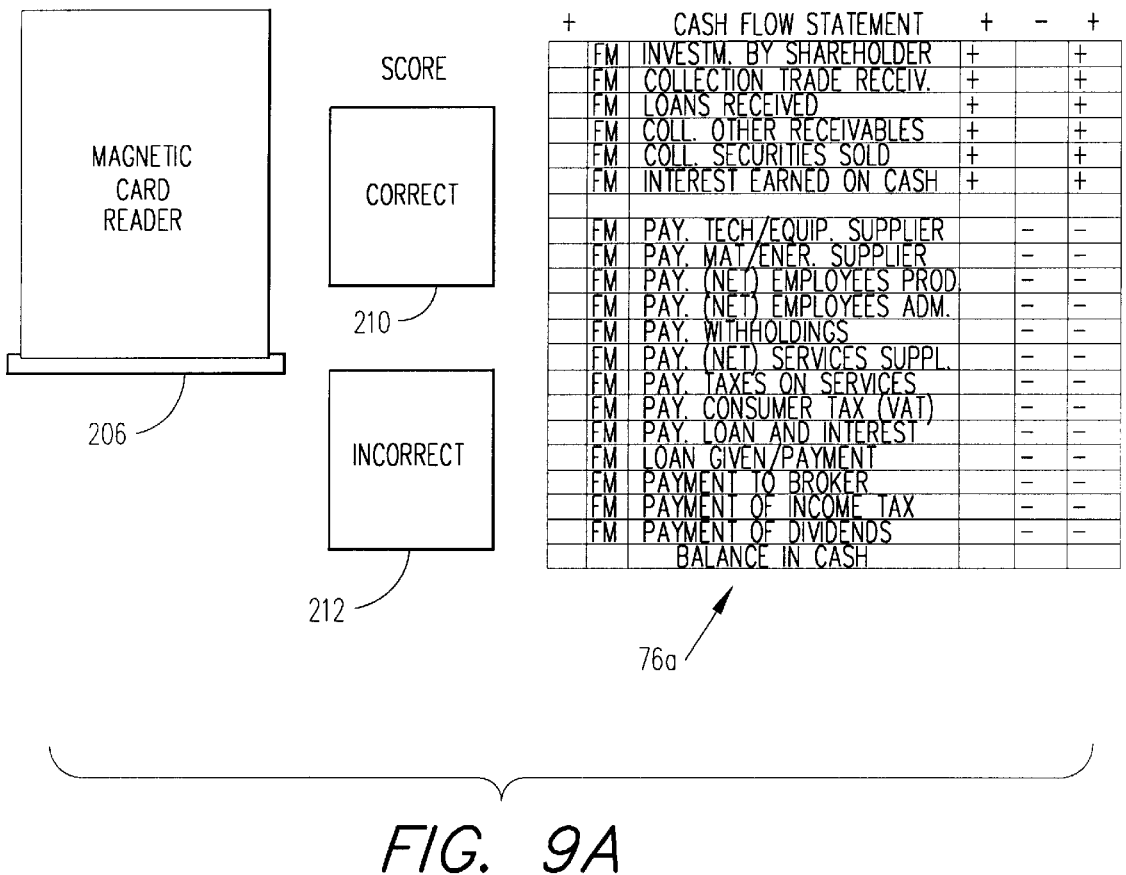
FIG. 9A illustrates the cash flow statement and magnetic transaction card reader portions of a transaction display including electronic entry means.
Figure 9B:
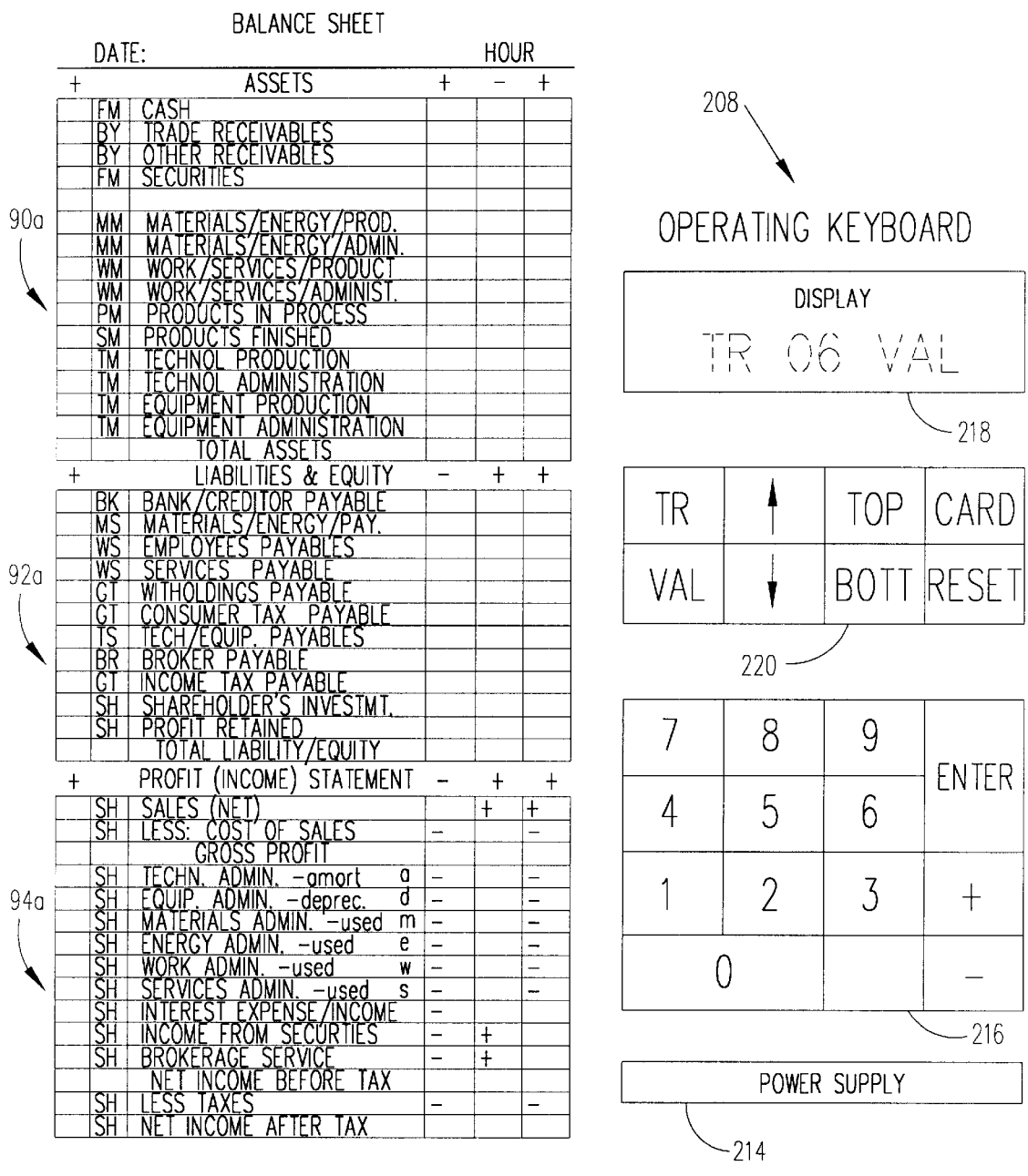
FIG. 9B illustrates the balance sheet and keyboard portions of a transaction display including electronic entry means.

As noted further above, the present method of teaching economics, management and accounting lends itself well to operation by electronic or computerized means. FIGS. 9A and 9B illustrate portions of an exemplary electronic transaction board or sheet, generally corresponding to the "C" and "D" portions of FIGS. 1 through 7. (The "A" and "B" portions of those Figures need not change appreciably, whether printed on paper or other medium, or displayed on a computer screen.) In FIG. 9A, the card placement area of the "C" portions of FIGS. 1 through 7, has been replaced with a magnetic card reader 206. Thus, participants may use transaction cards such as those exemplified in FIG. 8, but having magnetic information storage means thereon, as is conventionally known in credit cards, public transportation fare cards, etc. Such a card may be placed in the card reader 206, with information being contained on the card then being automatically transferred to the appropriate lines of electronic or computerized embodiments of the forms, sheets and tables used in the present economics teaching method, such as the electronically displayed embodiment 76a shown in FIG. 9A of the cash flow statements 76 of other drawing Figures. The portions 90 through 94 of the balance sheets shown in the "D" portions of FIGS. 1 through 7 may also be provided electronically, as in the embodiments 90a through 94a of FIG. 9B, as well as the portions 44 and 46 of the monitoring system and the transaction table 60 and other components illustrated in the drawing Figures.

Such magnetically encoded cards may also include graphic information thereon, as in the cards 110 through 118 of FIG. 8. Thus, a participant or student of the present economics teaching method may manually enter the data related to a given business transaction (TR), the transaction card (CARD), and its arbitrarily determined value (VAL), by using the keyboard 208 of FIG. 9B. The card is then scanned by means of the magnetic reader 206 of FIG. 9A. If the data entered (e.g., the specific transaction and card numbers) coincide with the corresponding transaction definition contained in the transaction table 60, then the "correct" light 210 of FIG. 9A is illuminated Otherwise, the "incorrect" light is illuminated and electronically scored, as applicable.

The keyboard 208 of FIG. 9B includes a conventional power supply 214 (e.g., household current and transformer and rectifier means, batteries, etc.) for providing the electrical power required to operate the electronic embodiment of the present system. A numerical keypad 216 is provided for entry of transaction and card numbers, with their values being arbitrarily determined for the purposes of the present teaching exercises. Transaction number, card number and value entered appear on the display 218 at the top of the keyboard area 208. Also, a card and transaction type keypad 220 is provided, for entry of various factors (e.g., "card" and entry on the numerical keypad 216 of the card number, "val" for entry of the monetary value of the transaction, etc.). Arrow keys are used to return to the previous transaction, or advance to the next transaction. The "TOP" and "BOTTOM" keys are used respectively for returning to the first (or "top") transaction, and for advancing to the last (or "bottom") transaction, as desired.

Figure 10:
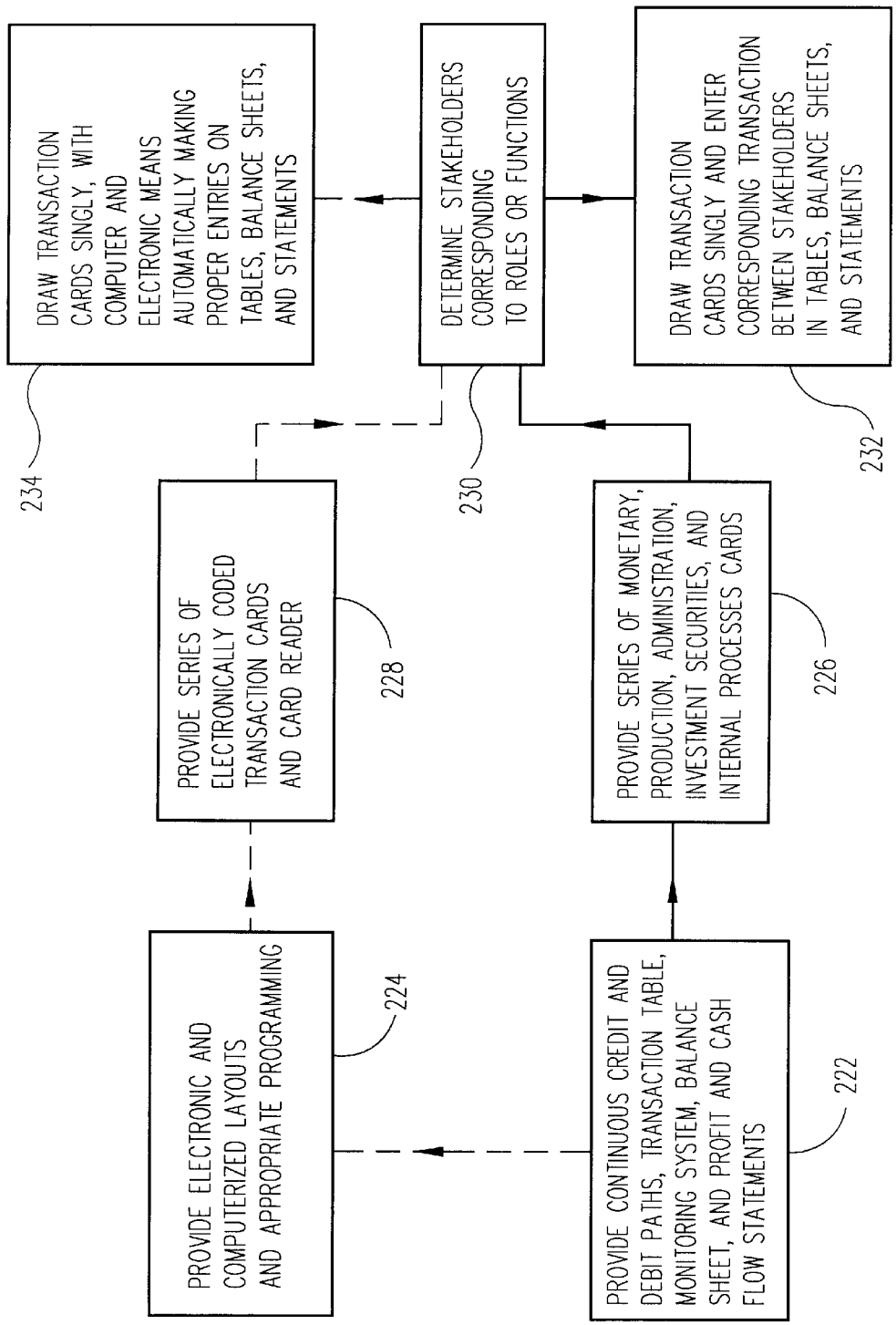
FIG. 10 is a flow chart illustrating the basic steps in the present economics teaching method.

FIG. 10 provides a block diagram or flow chart of the general steps involved in the present method for teaching economics. The first step 222 indicates the provision of the transaction sheet or table described herein, including the continuous credit and debit paths of the round table or corporate board 10 (with extended "credit" hands and withdrawn "debit" hands of the participants contacting the two paths), the transaction table 60, the asset and liability or equity tables 44 and 46 of the board 10, balance and profit sheet portions 90 through 94, and cash flow statement 76. Alternatively, each of the above components of the present teaching method may be provided electronically or by means of one or more computers, as indicated by the alternative step 224.

The next step 226 generally describes the provision of a series of transaction cards, such as the cards exemplified in FIG. 8 of the drawings. Again, such cards may be electronically coded for use with a card reader, as indicated by alternate step 228.

At this point, the stakeholders or participants in the teaching session are determined, as indicated generally by the third step 230 of FIG. 10. The present economics teaching method is particularly valuable for educating existing corporate and government officials in the economic transactions involved in their operations, and as such the participants may be selected from persons who hold such positions or responsibilities in their working careers. However, it will be seen that others interested in learning economic, management and accounting theory may take part in the present teaching method. In any event, each participant takes a specific role as one of the stakeholders or officials, either within the enterprise or dealing with the enterprise, generally as shown on the round table or corporate board 10 of the drawing Figures.

At this point, one of the participants (e.g., the CEO) may select one of the transaction cards, with the corresponding transaction being entered on the appropriate lines of the appropriate forms and sheets of the present system or method, as indicated generally by the fourth step 232 of FIG. 10. Alternatively, the card may be read electronically with data therefrom being entered automatically, or by keyboard means, as shown generally by the apparatus of FIGS. 9A and 9B discussed further above. Such electronic processing of the transactions of the present teaching method is shown generally by the alternative fourth step 234 of FIG. 10. The teaching process or method continues in accordance with the above disclosure, with participants or "stakeholders" in the virtual enterprise learning the credit and debit results of each transaction, and the balance of all transactions among the various parties involved.

In summary, the present method for teaching economics and its associated disciplines of management and accounting provides a means for visual and tactile reinforcement of the flow of goods and services, as exemplified by the transaction cards of the present invention, as those goods and services flow from their sources (liabilities and equity) to their disposition at the asset side of the system, even though some of those goods and services may remain on that side only momentarily and return to the source side as expensed goods or services ending up in the hands of the shareholders. Alternatively, others of those goods and services after arriving from their sources will flow through the hands of various managers (the so called cost centers) to end up finally in the hands of buyers or consumers as a final product or service.

The present method provides a visual display of a complete virtual enterprise or economic organization, with all practicable transactions which might be transacted by or with such an organization, and all corresponding issues which the management (teaching session participants) might wish to deal with. The present method essentially includes three unique aspects, with other aspects of the method stemming from these three: (1) a "round table," or other actual or virtual playing surface or field, which includes two concentric paths or tracks symbolizing the giving or crediting of goods and services, and the receiving or debiting of those goods and services; (2) the designation of specific participant roles as shareholders; and (3) a series of transaction cards, defining transactions as even transactions between any two participants.

It will be seen that the balanced transaction principle (debit=receiving, credit=giving) upon which the present economics teaching method is based, may be expanded to encompass other aspects, e.g., ethical and social, of human society. Indeed, the present economic teaching method may be expanded to apply to virtually any private or corporate enterprise, government agency, or virtually any cultural or social entity. The present method teaches that human functions in an enterprise are distinct from the things or goods and services as symbolized by the transaction cards of the present invention. That "human side" of the business enterprise is also permanently visible in the definition of business transactions which, in effect, mean that someone is receiving (and being debited for receiving) a specific genre of a good or service that is meaningfully predefined for management and accounting purposes.

The present economics teaching method clearly shows how every transaction affects the economic and/or financial status of each stakeholder, i.e., his or her responsibility and/or rights, and how the conventional balance sheet, income or profit statement, cash flow statement, or any other corporate information appear reflecting these transactions. By computerizing the present method, all accounts are kept current to the instant of each transaction, with the monitoring system providing an instant record of all transactions as they are registered.

It will also be seen that after a number of groups of participants have learned the present economic and business systems according to the present teaching method, that they may compete against one another in a simulation of two or more corporate entities, if desired. If several corporations are simulated simultaneously, the winner may be determined by the simulated corporation which earns the highest overall score of performance based upon the rules of business behavior previously agreed upon. If a single corporation is simulated, the contest develops among its stakeholders. The highest score will correspond jointly to the CEO and the stakeholder who had excelled in his or her behavior to the extent of enabling the simulated corporation to achieve its principle short term and long term objectives. As can be observed, this broad coverage of the present teaching method provides for an effective "virtualization" of real-life business activities; this is not the case with simple "Monopoly" type games.

While nominally sixteen students or participants are involved in a training session using the present method, it will be seen that the roles used in the present method may be expanded, with up to twenty two participants involved when some roles are divided and others added. It will be seen that the participants in the present economics teaching method need not be physically located in a single location, but may be located in different areas (cities, structures, etc.), when the present method is computerized. Interactions of the participants by means of the Internet, local network, etc. may be provided using the computerized means described generally herein. Such computerized means also opens the way for additional participants as desired, without limiting the number to correspond to the executive or corporate positions of the board. Accordingly, the present method for teaching the combined disciplines of economics, management and accounting in a fully graphical, visual, and/or live scenario, should singularly prove time and cost effective, and in addition be an entertaining and socially enriching experience which may be expanded to other areas of human endeavor as well.

While the above disclosure has emphasized the use of the present invention in the teaching of economics, it will be seen that the present system may be readily adapted for use in business and other transactions as well. Such a business or other transaction system will of course not require the use of transaction cards which would randomize the various transactions involved, but otherwise, transactions may be carried out in accordance with the various tables provided by the present method and system, with the result being a clearer understanding of the transaction process and factors involved.

It is to be understood that the present invention is not limited to the embodiments described above, but encompasses any and all embodiments within the scope of the following claims.

I claim:

1. A method for teaching economics, comprising the following steps:
    (a) providing a plurality of transaction sheets, with each of the sheets including:
        (i) a first area simulative of a corporate board having a plurality of stakeholder positions with representations of stakeholders and a monitoring system;
        (ii) a second area having a transaction table describing transactions;
        (iii) a third area having a cash flow statement; and
        (iv) a fourth area having a balance sheet and corresponding profit and loss statement;
    (b) providing a plurality of transaction cards, each of the cards corresponding to transactions described on the transaction table;
    (c) arranging a plurality of participants, with each of the participants acting as a stakeholder corresponding to one of the stakeholder positions of the corporate board area;
    (d) drawing a first transaction card from the plurality of transaction cards;
    (e) indicating the stakeholders participating in a transaction according to the first transaction card;
    (f) entering the transaction described on the first transaction card in the appropriate areas of a first transaction sheet; and
    (g) continuing steps (d)–(f) in the above manner in accordance with the transactions described upon subsequent transaction cards.

2. The method for teaching economics according to claim 1, including the steps of:
    (a) dividing the stakeholders into a managerial group and a goods and services supplier group; and
    (b) providing the monitoring system with a managerial function portion corresponding to the managerial group of stakeholders and a goods and services supply portion corresponding to the goods and services supplier stakeholders.

3. The method for teaching economics according to claim 1, including the steps of:
    (a) dividing the stakeholders into a managerial group and a goods and services supplier group; and
    (b) providing the transaction table with a series of transactions corresponding to each of the possible transaction interactions of the managerial group and goods and services supplier group of stakeholders.

4. The method for teaching economics according to claim 1, including the step of providing a credit marker and a debit marker, and said indicating includes the placing of the credit marker at a giving stakeholder position and the placing of the debit marker at a receiving stakeholder position.

5. The method for teaching economics according to claim 1, including the steps of:
    (a) numbering the transactions of the transaction table;
    (b) numbering the cards to correspond with the numbers of the transactions of the transaction table; and
    (c) providing written and symbolic indications of the transaction of each of said cards, according to the numerically corresponding transaction of the transaction table.

6. The method for teaching economics according to claim 1, including the steps of:
    (a) providing a first location on the corporate board area of the transaction sheet;
    (b) providing a second location on the corporate board area of the transaction sheet; and
    (c) entering card number, function, and value of the card in the first location, and entering a transaction number and type of transaction in the second location.

7. The method for teaching economics according to claim 1, including the steps of:
    (a) color coding each of said cards to symbolize the type of transaction represented by the corresponding card; and
    (b) color coding the transaction table corresponding to transactions described upon each corresponding card.

8. A method for teaching economics, comprising the following steps:
    (a) providing electronic means for a plurality of transaction sheets, with each of the sheets including:
        (i) a first area simulative of a corporate board having a plurality of stakeholder positions with representations of stakeholders and a monitoring system;
        (ii) a second area having a transaction table describing transactions;
        (iii) a third area having a cash flow statement; and
        (iv) a fourth area having a balance sheet and corresponding profit and loss statement;
    (b) providing electronic means for a plurality of transaction cards corresponding to transactions described on the transaction table;
    (c) arranging a plurality of participants, with each of the participants acting as a stakeholder corresponding to one of the stakeholder positions of the corporate board area;
    (d) electronically selecting a first transaction card from the plurality of transaction cards;
    (e) electronically automatically indicating the stakeholders participating in a transaction according to the first transaction card;
    (f) electronically automatically computing and entering the transaction described on the first transaction card in the appropriate areas of a first transaction sheet; and
    (g) continuing steps (d)–(f) in the above manner in accordance with the transactions described upon subsequent transaction cards.

9. The method for teaching economics according to claim 8, including the steps of:
    (a) dividing the stakeholders into a managerial group and a goods and services supplier group; and
    (b) providing the monitoring system with a managerial function portion corresponding to the managerial group of stakeholders and a goods and services supply portion corresponding to the goods and services supplier stakeholders.

10. The method for teaching economics according to claim 8, including the steps of:

(a) dividing the stakeholders into a managerial group and a goods and services supplier group; and (b) providing the transaction table with a series of transactions corresponding to each of the possible transaction interactions of the managerial group and goods and services supplier group of stakeholders.

11. The method for teaching economics according to claim 8, including the step of providing electronic credit marker and debit marker means, and said indicating includes electronically placing the electronic credit marker at the giving stakeholder position and electronically placing the debit marker at the receiving stakeholder position.

12. The method for teaching economics according to claim 8, including the steps of:

(a) numbering the transactions of the transaction table;

(b) numerically differentiating the cards to correspond with the numbers of the transactions of the transaction table; and (c) electronically providing written and symbolic indications of the transaction of each of said cards, according to the numerically corresponding transaction of the transaction table.

13. The method for teaching economics according to claim 8, including the steps of:

(a) electronically providing a first location on the corporate board area of the transaction sheet;

(b) electronically providing a second location on the corporate board area of the transaction sheet; and (c) electronically entering a card number, function, and value of the card in the first location, and electronically entering a transaction number and type of transaction in the second location.

14. The method for teaching economics according to claim 8, including the steps of:

(a) color coding each of said cards, to symbolize the type of transaction; and (b) color coding the transaction table corresponding to transactions described upon each of said cards.

15. The game for teaching economics according to claim 8 wherein said corporate board area includes:

(a) a first location for recording a card number, function, and value of said transaction card; and (b) a second location for recording a transaction number and type of transaction.

16. A game for teaching economics, comprising the following:

(a) a plurality of transaction sheets, with each of the sheets including:

(i) a first area simulative of a corporate board having a plurality of stakeholder positions with representations of stakeholders and a monitoring system;

(ii) a second area having a transaction table describing transactions;

(iii) a third area having a cash flow statement; and (iv) a fourth area having a balance sheet and corresponding profit and loss statement;

(b) a plurality of transaction cards, each of the cards corresponding to transactions described on the transaction table; and (c) a plurality of participants, with each of the participants acting as a stakeholder corresponding to one of the stakeholder positions of the corporate board area;

wherein a first transaction card is drawn from the plurality of transaction cards and enables the participants to determine the stakeholders participating in a first transaction, and the transaction described on the first transaction card is entered in the appropriate areas of a first transaction sheet, and the game continues in accordance with the transactions described upon subsequent transaction cards.

17. The game for teaching economics according to claim 16:

(a) wherein said stakeholder positions on said corporate board area are divided into a managerial group and a goods and services supplier group; and (b) said monitoring system includes a managerial function portion corresponding to managerial group of stakeholders and a goods and services supply portion corresponding to goods and services supplier stakeholders.

18. The game for teaching economics according to claim 16 further including a credit marker and a debit marker for indicating a giving stakeholder position and a receiving stakeholder position.

19. The game for teaching economics according to claim 16 wherein:

(a) said transactions of said transaction table include numbers;

(b) said cards are numbered to correspond with said numbers of said transactions; and (c) said cards include written and symbolic indications of according to the numerically corresponding transaction of said transaction table.

20. The game for teaching economics according to claim 16 wherein said cards and said transaction table are color coded to symbolize the type of transaction represented.

* * * * *